United States Patent
Inagaki et al.

(10) Patent No.: US 9,728,809 B2
(45) Date of Patent: Aug. 8, 2017

(54) NONAQUEOUS ELECTROLYTE BATTERY, BATTERY PACK AND VEHICLE

(75) Inventors: Hiroki Inagaki, Kawasaki (JP); Yumi Fujita, Yokohama (JP); Norio Takami, Yokohama (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 1978 days.

(21) Appl. No.: 11/965,303

(22) Filed: Dec. 27, 2007

(65) Prior Publication Data

US 2008/0166637 A1 Jul. 10, 2008

(30) Foreign Application Priority Data

Jan. 4, 2007 (JP) .................................. 2007-000198

(51) Int. Cl.
*H01M 10/05* (2010.01)
*H01M 10/0567* (2010.01)
(Continued)

(52) U.S. Cl.
CPC ....... *H01M 10/0567* (2013.01); *H01M 4/366* (2013.01); *H01M 4/485* (2013.01); *H01M 10/0525* (2013.01); *B60K 6/28* (2013.01); *B60K 6/445* (2013.01); *B60K 6/46* (2013.01); *B60K 6/48* (2013.01); *B60Y 2200/12* (2013.01); *H01M 4/131* (2013.01); *H01M 10/0569* (2013.01);
(Continued)

(58) Field of Classification Search
USPC ................. 429/188, 306, 324, 329
See application file for complete search history.

(56) References Cited

U.S. PATENT DOCUMENTS 5,556,723 A * 9/1996 Ohsaki ................ H01M 4/0459
264/29.2
5,591,546 A * 1/1997 Nagaura ............. H01M 2/0272
429/156
(Continued)

FOREIGN PATENT DOCUMENTS

CN 1416189 A 5/2003
CN 1430306 A 7/2003
(Continued)

OTHER PUBLICATIONS

JP 2003163029 A machine English Translation.*
(Continued)

*Primary Examiner* — Scott J Chmielecki
(74) *Attorney, Agent, or Firm* — Oblon, McClelland, Maier & Neustadt, L.L.P.

(57) ABSTRACT

A nonaqueous electrolyte battery includes a positive electrode, a negative electrode and a nonaqueous electrolyte. The negative electrode contains a titanium-containing oxide. The nonaqueous electrolyte contains a compound having a functional group represented by the formula (1) below and a sultone having an unsaturated hydrocarbon group.
[Chem.]

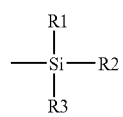

(1)

22 Claims, 9 Drawing Sheets

(51) Int. Cl.
| | |
|---|---|
| *H01M 4/36* | (2006.01) |
| *H01M 4/485* | (2010.01) |
| *H01M 10/0525* | (2010.01) |
| *B60K 6/28* | (2007.10) |
| *B60K 6/445* | (2007.10) |
| *B60K 6/46* | (2007.10) |
| *B60K 6/48* | (2007.10) |
| *H01M 4/131* | (2010.01) |
| *H01M 10/0569* | (2010.01) |
| *H01M 4/02* | (2006.01) |

(52) U.S. Cl.
CPC ............ *H01M 2004/021* (2013.01); *H01M 2004/027* (2013.01); *H01M 2300/004* (2013.01); *Y02E 60/122* (2013.01); *Y02T 10/6217* (2013.01); *Y02T 10/6221* (2013.01); *Y02T 10/6239* (2013.01)

(56) References Cited

U.S. PATENT DOCUMENTS

| | | | | | |
|---|---|---|---|---|---|
| 6,068,950 | A | * | 5/2000 | Gan | H01M 6/168 429/231.9 |
| 6,203,942 | B1 | * | 3/2001 | Gan | H01M 10/0567 429/203 |
| 7,629,081 | B2 | * | 12/2009 | Inagaki | H01M 4/131 429/231.1 |
| 7,642,015 | B2 | * | 1/2010 | Inada | H01M 2/266 429/231.8 |
| 2001/0046628 | A1 | * | 11/2001 | Oesten | C01G 45/1242 429/231.1 |
| 2002/0006548 | A1 | * | 1/2002 | Tsutsue | H01M 4/131 429/217 |
| 2002/0055047 | A1 | * | 5/2002 | Satoh | H01M 4/133 429/337 |
| 2002/0086216 | A1 | * | 7/2002 | Sekino | H01M 6/164 429/330 |
| 2002/0136951 | A1 | * | 9/2002 | Gan | H01M 4/5825 429/212 |
| 2004/0175621 | A1 | * | 9/2004 | Iriyama | H01M 4/134 429/231.95 |
| 2005/0221187 | A1 | * | 10/2005 | Inagaki | H01M 4/131 429/231.95 |
| 2005/0287442 | A1 | * | 12/2005 | Kim | H01M 10/052 429/326 |
| 2006/0022634 | A1 | * | 2/2006 | Nomura | C09D 175/16 320/107 |
| 2006/0269846 | A1 | * | 11/2006 | Xu et al. | 429/326 |
| 2008/0166637 | A1 | * | 7/2008 | Inagaki | H01M 4/366 429/329 |
| 2008/0176142 | A1 | * | 7/2008 | Inagaki | B60L 11/123 429/330 |
| 2009/0061303 | A1 | * | 3/2009 | Inagaki | H01M 4/485 429/163 |
| 2009/0226808 | A1 | * | 9/2009 | Hiwara | H01G 9/038 429/200 |

FOREIGN PATENT DOCUMENTS

| | | |
|---|---|---|
| JP | 9-309728 | 12/1997 |
| JP | 09309728 A * | 12/1997 |
| JP | 2000-331710 | 11/2000 |
| JP | 2000331710 A * | 11/2000 |
| JP | 2001-210324 A | 8/2001 |
| JP | 2001-319685 A | 11/2001 |
| JP | 2002-329528 | 11/2002 |
| JP | 2003163029 A * | 6/2003 |
| JP | 2003-257479 | 9/2003 |
| JP | 2004-39510 A | 2/2004 |
| JP | 2004-87437 A | 3/2004 |
| JP | 2004-171981 A | 6/2004 |
| JP | 2004-175609 A | 6/2004 |
| JP | 2004-342607 | 12/2004 |
| JP | 2005-158721 A | 6/2005 |
| JP | 2005-317508 A | 11/2005 |
| JP | 2006-278282 A | 10/2006 |
| JP | 2006-294519 | 10/2006 |
| JP | 2006294519 A * | 10/2006 |
| JP | 2006-318797 A | 11/2006 |
| JP | 2007-207723 A | 8/2007 |
| JP | 2007-250415 A | 9/2007 |
| JP | 2008-91326 A | 4/2008 |
| JP | 2008-146929 A | 6/2008 |
| KR | 10-2006-0111829 | 10/2006 |

OTHER PUBLICATIONS

JP 2003-163029 A English Machine translation.*
JP 2006-294519 A English Machine Translation.*
U.S. Appl. No. 12/366,914, Feb. 6, 2009, Inagaki, et al.
Office Action mailed on Nov. 18, 2009, in Korean Patent Application No. 10-2008-0000750 (with English Translation).
Office Action issued Mar. 27, 2009 in Chinese Application No. 200810001946.4 (With English Translation).
U.S. Appl. No. 13/208,731, Aug. 12, 2011, Kishi, et al.
U.S. Appl. No. 13/560,375, Jul. 27, 2012, Kishi, et al.
U.S. Appl. No. 13/778,836, filed Feb. 27, 2013, Inagaki, et al.
Office Action issued May 14, 2013 in Japanese Patent Application No. 2007-338028 with English translation.
Office Action in Chinese corresponding application No. 200810001946.4, dated Jun. 19, 2014. (w/English Translation).
Office Action dated May 14, 2013 in Japanese Patent Application No. 2007-338028 with English translation.

* cited by examiner

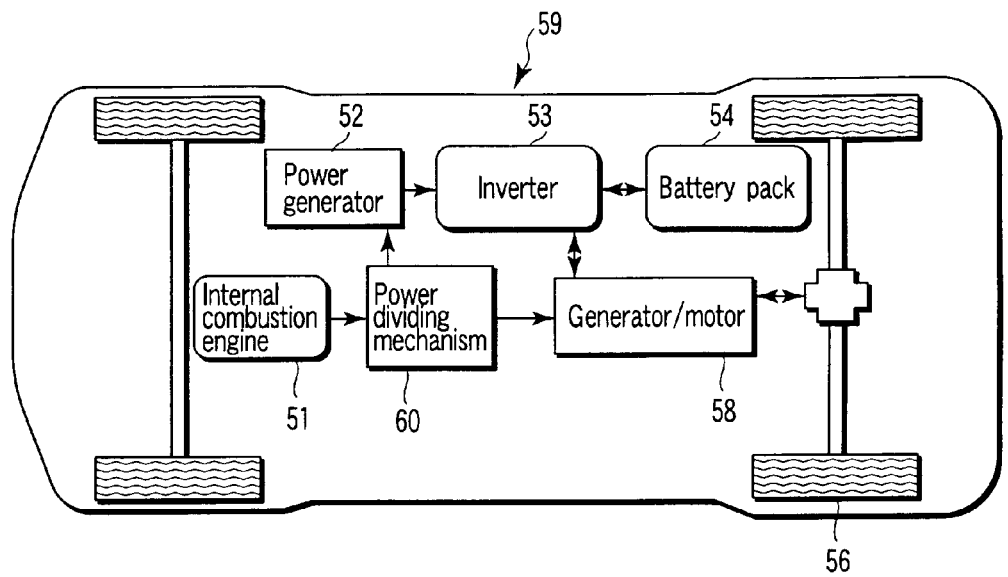
F I G. 11
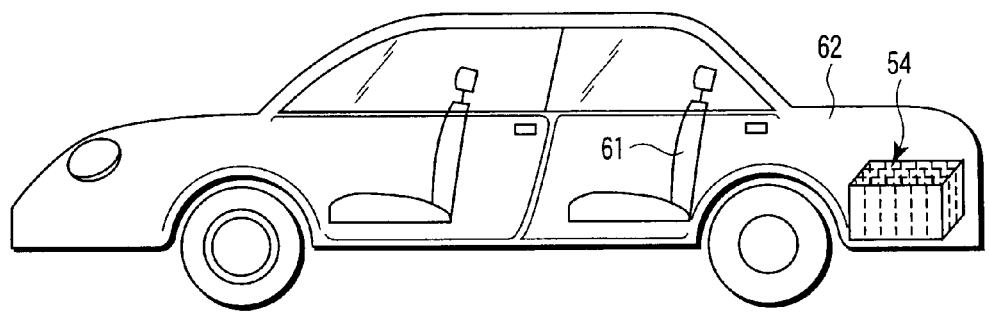
F I G. 12

NONAQUEOUS ELECTROLYTE BATTERY, BATTERY PACK AND VEHICLE

CROSS-REFERENCE TO RELATED APPLICATIONS

This application is based upon and claims the benefit of priority from prior Japanese Patent Application No. 2007-000198, filed Jan. 4, 2007, the entire contents of which are incorporated herein by reference.

BACKGROUND OF THE INVENTION

1. Field of the Invention

The present invention relates to a nonaqueous electrolyte battery, a battery pack and a vehicle provided with the nonaqueous electrolyte battery.

2. Description of the Related Art

In nonaqueous electrolyte batteries, lithium ions are transferred between a negative electrode and a positive electrode to charge and discharge. These nonaqueous electrolyte batteries have been researched and developed as high-energy density batteries.

Nonaqueous electrolyte batteries using a lithium-transition metal composite oxide as a positive electrode active material and a carbonaceous material as a negative electrode active material have already been commercialized. Generally, Co, Mn, Ni or the like is used as the transition metal component of the lithium-transition metal composite oxide.

A nonaqueous electrolyte battery using a lithium-titanium oxide as the negative electrode active material has been recently put to practical use. The lithium-titanium oxide has a lithium ion absorption potential of about 1.55V vs Li/Li$^+$, which is higher than that of a carbonaceous material. A lithium-titanium oxide is reduced in the variation of volume associated with charge and discharge and is therefore superior in cycle performance. Also, lithium ions are inserted in and released from the lithium-titanium oxide by a reaction that no lithium metal is precipitated on the negative electrode and therefore, it enables charge under a large current. Specifically, a rapid charge can be performed.

Since lithium-titanium oxide has a lithium ion absorption potential of as high as about 1.55V (vs Li/Li$^+$), a protective film is hardly formed on the surface of a negative electrode. Consequently, incidence of self-discharge increases.

1,3-propene sultone is added to the nonaqueous electrolytic solution in JP-A 2002-329528 (KOKAI) in order to suppress self-discharge. JP-A 2002-329528 (KOKAI) also describes adding boron-containing compounds such as trimethylsilyl borate to the nonaqueous electrolytic solution.

However, since the protective film formed on the negative electrode by the nonaqueous electrolytic solution according to JP-A 2002-329528 (KOKAI) has high resistance, large current performance is impaired.

On the other hand, JP-A 2004-342607 (KOKAI) describes an effect for preventing reductive decomposition of the nonaqueous electrolytic solution at the negative electrode with a phosphoric ester compound having a silyl.

However, since reduction resistance of the nonaqueous electrolytic solution according to JP-A 2004-342607 (KOKAI) is not sufficient, cycle life of the nonaqueous electrolyte battery decreases.

BRIEF SUMMARY OF THE INVENTION

According to a first aspect of the present invention, there is provided a nonaqueous electrolyte battery, comprising:

a positive electrode;

a negative electrode containing a titanium-containing oxide; and a nonaqueous electrolyte containing a compound having a functional group represented by the formula (1) below and a sultone having an unsaturated hydrocarbon group,

[Chem.]

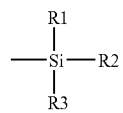

(1)

wherein R1 to R3 each independently represent an alkyl group having 1 to 10 carbon atoms, an alkenyl group having 2 to 10 carbon atoms or an aryl group having 6 to 10 carbon atoms.

According to a second aspect of the present invention, there is provided a battery pack comprising a nonaqueous electrolyte battery, wherein the nonaqueous electrolyte battery comprises:

a positive electrode;

a negative electrode containing a titanium-containing oxide; and a nonaqueous electrolyte containing a compound having a functional group represented by the formula (1) below and a sultone having an unsaturated hydrocarbon group,

[Chem.]

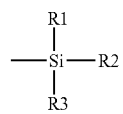

(1)

wherein R1 to R3 each independently represent an alkyl group having 1 to 10 carbon atoms, an alkenyl group having 2 to 10 carbon atoms or an aryl group having 6 to 10 carbon atoms.

BRIEF DESCRIPTION OF THE SEVERAL VIEWS OF THE DRAWING

FIG. 11 schematically illustrates a series-parallel hybrid vehicle according to the third embodiment;

FIG. 12 schematically illustrates a vehicle according to the third embodiment;

DETAILED DESCRIPTION OF THE INVENTION

Figure 1:
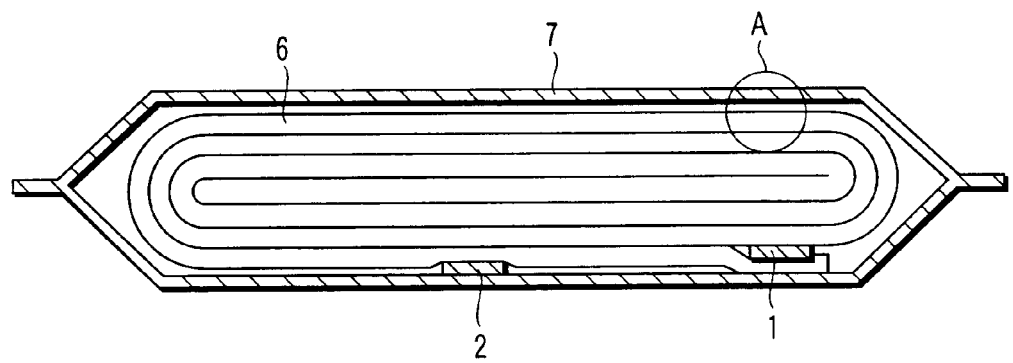
FIG. 1 shows a schematic cross section of a flat nonaqueous electrolyte secondary battery according to a first embodiment.

The inventors have found the following effects through intensive studies. It was found that self-discharge may be largely suppressed and cycle performance may be improved without largely decreasing large current performance when a nonaqueous electrolyte contains a sultone having an unsaturated hydrocarbon group and a compound having the functional group represented by the formula (1) below in a nonaqueous electrolyte battery having a negative electrode using a titanium-containing oxide as a negative electrode active material. This is because a low resistance coating film is formed on the surface of the negative electrode as compared with adding only a sultone having an unsaturated hydrocarbon group to the nonaqueous electrolyte.

[Chem.]

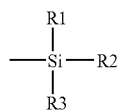

(1)

In the formula, R1 to R3 each independently represent an alkyl group having 1 or more to 10 or less carbon atoms, an alkenyl group having 2 or more to 10 or less carbon atoms, or an aryl group having 6 or more to 10 or less carbon atoms.

In the nonaqueous electrolyte battery so configured as described above, the compound having the functional group represented by the formula (1) is decomposed by reduction at the negative electrode by initial charging in advance of decomposition of sultone. Accordingly, reductive decomposition of sultone is suppressed and a low resistance coating film is formed on the surface of the negative electrode. Consequently, self-discharge is suppressed without impairing large current performance, and charge-discharge cycle life is improved.

For example, when a carbonaceous material that absorbs and desorbs lithium ion is used as a negative electrode active material, reductive decomposition of sultone and reductive decomposition of the compound having the functional group represented by the formula (1) occur almost simultaneously since the lithium ion absorption potential of the negative electrode active material is less than 0.4V (vs Li/Li$^+$). Consequently, reductive decomposition of sultone advances and thus a high resistance protective film is formed on the surface of the negative electrode. Materials other than the titanium-containing oxides, such as ferric sulfide, also serve as the negative electrode active material having the lithium ion absorption potential of 0.4V (vs Li/Li$^+$) or more. Since reductive decomposition of the compound having the functional group represented by the formula (1) is slow at the materials other than the titanium-containing oxides, reductive decomposition of sultone advances and a high resistance protective film is formed on the surface of the negative electrode. Consequently, large current performance as well as charge-discharge cycle life become poor.

The inventors of the invention have found that the effect is more evident when the negative electrode has a first peak having a mode diameter of 0.01 μm or more to 0.2 μm or less in pore diameter distribution measured by mercury porosimetry, and when the volume of the pore having a diameter of 0.01 μm or more to 0.2 μm or less, which is obtained by mercury porosimetry, is from 0.05 mL or more to 0.5 mL or less per 1 g of the weight of the negative electrode excluding the weight of a negative electrode current collector. Since the presence of macropores having the above-mentioned size and amount permits the protective film to be uniformly formed in the macropores of the negative electrode, the resistance of the negative electrode may be reduced. Consequently, the effect caused by forming the protective film may be sufficiently exhibited.

When the negative electrode has the above-mentioned first peak and pore volume as well as a second peak having a mode diameter of 0.003 μm or more to 0.02 μm or less in pore diameter distribution, and when the volume of the pore having a diameter of 0.003 μm or more to 0.02 μm or less, which is obtained by mercury porosimetry, is from 0.0001 mL or more to 0.02 mL or less per 1 g of the weight of the negative electrode excluding the weight of a negative electrode current collector, large current performance and charge-discharge cycle performance may be further improved. This is because the presence of the macropores and mesopores each having the above-mentioned size and amount not only enhances homogeneity of the protective film but also effectively facilitates impregnation of the nonaqueous electrolyte by a capillary phenomenon to enable the surface coating film of the negative electrode active material to have low resistance.

Each embodiment will be described below with reference to drawings. The elements common throughout the embodiments are given the same reference numerals, and overlapped descriptions are omitted. The drawings are provided as illustrations for describing the invention and for facilitating comprehension of the invention, and configuration, size and ratio in each drawing may be different from those of practically used devices. However, the design of the device may be appropriately changed in terms of descriptions as set forth below and known art.

An example of the structure of the nonaqueous electrolyte battery according to the embodiment will be described with reference to FIGS. 1 and 2. FIG. 1 shows a schematic cross section of a flat nonaqueous electrolyte secondary battery according to the embodiment, and FIG. 2 shows a partial schematic cross section of a detailed structure of the portion surrounded by circle A in FIG. 1.

As shown in FIG. 1, a flat-shape coiled electrode group 6 is housed in an outer package member 7. The coiled electrode group 6 has a structure in which a positive electrode 3 and a negative electrode 4 are spirally coiled with a separator 5 interposed therebetween. A nonaqueous electrolyte is held in the coiled electrode group 6.

Figure 2:
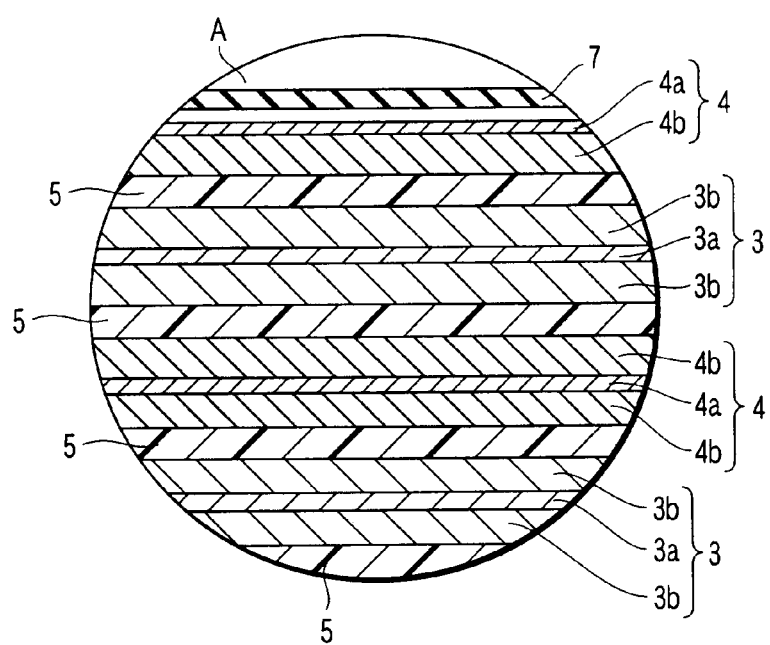
FIG. 2 shows a partial schematic cross section of a detailed structure of the portion surrounded by circle A in FIG. 1.

As shown in FIG. 2, the negative electrode 4 is positioned on the outermost periphery of the coiled electrode group 6, and the positive electrodes 3 and the negative electrodes 4 are alternately laminated with the separator 5 interposed therebetween in such a manner that on the inside periphery of the negative electrode 4, separator 5, positive electrode 3, separator 5, negative electrode 4, separator 5, positive electrode 3, separator 5 . . . are laminated in this order. The negative electrode 4 comprises a negative electrode current collector 4a and a negative electrode active material-containing layer 4b supported by the negative electrode current collector 4a. The negative electrode active material-containing layer 4b is formed on only one surface of the negative electrode current collector 4a at a part positioned on the outermost periphery of the electrode group 6. The positive electrode 3 comprises a positive electrode current collector 3a and a positive electrode active material-containing layer 3b supported by the positive electrode current collector 3a.

As shown in FIG. 1, a band-shaped positive electrode terminal 1 is electrically connected to the positive electrode current collector 3a in the vicinity of the outer peripheral end of the coiled electrode group 6. On the other hand, a band-shaped negative electrode terminal 2 is electrically connected to the negative electrode current collector 4a in the vicinity of the outer peripheral end of the coiled electrode group 6. Each end of the positive electrode terminal 1 and the negative electrode terminal 2 is drawn externally from the same side of the outer package member 7.

The negative electrode, nonaqueous electrolyte, positive electrode, separator, outer package member, positive electrode terminal and negative electrode terminal will be described in detail hereinafter.

(1) Negative Electrode

The negative electrode includes a negative electrode current collector and a negative electrode active material-containing layer which is retained on one surface or both surfaces of the negative electrode current collector. A titanium-containing oxide is used for the negative electrode active material.

Examples of the titanium-containing oxide include $TiO_2$, a composite oxide containing Ti and at least one element selected from the group consisting of P, V, Sn, Cu, Ni, Co and Fe, lithium-titanium oxide and lithium titanium composite oxide in which a part of the constituting elements of lithium-titanium oxide is substituted with different kinds of elements. One kind or plural kinds of oxides may be used. Lithium-titanium oxide is preferable for obtaining excellent cycle performance.

Examples of lithium-titanium oxide include lithium titanate having a spinel structure such as $Li_{4+x}Ti_5O_{12}$ (x changes in the range of $0 \leq x \leq 3$ by a charge-discharge reaction), and lithium titanate having a rhamsdelite structure such as $Li_{2+y}Ti_3O_7$ (y changes in the range of $0 \leq y \leq 3$ by a charge-discharge reaction). While the molar ratios of oxygen are shown to be 12 in spinel type $Li_{4+x}Ti_5O_{12}$ ($0 \leq x \leq 3$) and 7 in rhamsdelite type $Li_{2+y}Ti_3O_7$ ($0 \leq y \leq 3$) in the formula, these values may be changed by the effect of non-stoichiometry of oxygen.

$TiO_2$ has an anatase structure, and preferably has low crystallinity obtained by heat-treatment in the temperature range of 300 to 500° C. Examples of the composite oxide containing Ti and at least one element selected from the group consisting of P, V, Sn, Cu, Ni, Co and Fe include $TiO_2$—$P_2O_5$, $TiO_2$—$V_2O_5$, $TiO_2$—$P_2O_5$—$SnO_2$ and $TiO_2$—$P_2O_5$—MeO (Me is at least one element selected from the group consisting of Cu, Ni, Co and Fe). The composite oxide preferably has a micro-structure in which a crystalline phase and an amorphous phase are mixed together or only the amorphous phase is present. Such micro-structure permits cycle performance to be largely improved.

The average particle diameter of the negative electrode active material is desirably 1 µm or less, since large current performance and charge-discharge cycle performance may not be improved sufficiently when the negative electrode active material having the average particle diameter of more than 1 µm is used. However, when the average particle diameter is too small, distribution of the nonaqueous electrolyte is biased to the negative electrode to possibly cause depletion of the electrolyte at the positive electrode. Accordingly, the lower limit of the average particle diameter is preferably 0.001 µm.

The negative electrode active material desirably has an average particle diameter of 1 µm or less and a specific surface area of 5 to 50 m$^2$/g as measured by a BET method by $N_2$ adsorption. Such negative electrode active material permits excellent large current performance and charge-discharge cycle performance to be obtained.

The negative electrode preferably has pore diameter distribution in the range described below when measured by mercury porosimetry.

<First Peak>

The pores reflected on the first peak are ascribed to pores formed among negative electrode forming elements such as particles of an active material, a conductive agent and a binder as a whole.

Impregnation of the nonaqueous electrolyte by the capillary phenomenon may be facilitated by adjusting the mode diameter of the first peak to be 0.2 µm or less in the pore diameter distribution of the negative electrode obtained by mercury porosimetry. The reason for adjusting the mode diameter to be 0.01 µm or more is as follows. A coating film generated by a reaction with the nonaqueous electrolyte is formed on the surfaces of the negative electrode active material and negative electrode conductive agent. Since the number of pores plugged by formation of the coating film may be reduced when the mode diameter of the first peak is 0.01 µm or more, liquid retaining property of the negative electrode, namely, nonaqueous electrolyte retaining property of the negative electrode may be improved. Accordingly, large current performance and charge-discharge cycle performance may be further improved when the mode diameter of the first peak is in the range of 0.01 µm or more to 0.2 µm or less. The range is more preferably from 0.02 µm or more to 0.1 µm or less.

The volume of the pore having a pore diameter in the range of 0.01 µm or more to 0.2 µm or less as measured by mercury porosimetry is desirably in the range of 0.05 mL or more to 0.5 mL or less per 1 g of the weight of the negative electrode excluding the weight of the negative electrode current collector. The reason for excluding the weight of the negative electrode current collector will be described first. A conductive substrate such as an aluminum foil is used for the negative electrode current collector as will be described later. Subtracting the weight of the negative electrode current collector from the weight of the negative electrode permits a weight fraction not related to the pore diameter distribution to be excluded. Depletion of the nonaqueous electrolyte in the negative electrode may be suppressed when the pore volume is 0.05 mL/g or more. Depletion of the nonaqueous electrolyte in a positive electrode may be also avoided when the pore volume is 0.5 mL/g or less since biasing of the distribution of the nonaqueous electrolyte to the negative electrode may be alleviated. Accordingly, charge-discharge cycle performance may be further improved when the pore volume is in the range of 0.05 mL/g or more to 0.5 mL/g or less. More preferable range of the pore volume is in the range of 0.1 mL/g or more to 0.3 mL/g or less.

The surface area of the pore having a diameter of 0.01 μm or more to 0.2 μm or less as measured by mercury porosimetry is desirably from 5 m$^2$ or more to 50 m$^2$ or less per 1 g of the weight of the negative electrode excluding the weight of the negative electrode current collector. The reason is as follows. The reason for excluding the weight of the negative electrode current collector has been already described. Adjusting the specific surface area of the pore to be 5 m$^2$/g or more permits the resistance of the coating film of the negative electrode to be reduced, an effect for facilitating impregnation of the nonaqueous electrolyte to be obtained, and formation of a desired coating film for suppressing generation of gases to be facilitated. When the specific surface area of the pore is 50 m$^2$/g or less, energy density may be improved by increasing the electrode density while output performance may be improved by improving electron conductivity. A more preferable range of the specific surface area of the pore is from 7 m$^2$/g or more to 30 m$^2$/g or less.

The negative electrode preferably has pores reflected on the second peak, for example mesopores, in addition to the pores reflected on the first peak, for example macropores. The pores reflected on the second peak will be described below.

<Second Peak>

The pores reflected on the second peak are ascribed to pores of the negative electrode active material as a whole.

When the negative electrode has the second peak having a mode diameter in the range of 0.003 μm or more to 0.02 μm or less in the pore diameter distribution measured by mercury porosimetry, impregnation ability of the nonaqueous electrolyte is remarkably enhanced to enable excellent large current performance and cycle performance to be realized. This is because capillary phenomenon is more effectively exhibited due to existence of the pores of the second peak and the surface of the coating film on the negative electrode active material is made to have low resistance. However, impregnation ability may be rather decreased when the mode diameter of the second peak is less than 0.003 μm since diffusivity of electrolytes having a larger molecular weight decreases. Accordingly, the lower limit of the mode diameter is preferably 0.003 μm, and the mode diameter is more preferably from 0.005 μm or more to 0.015 μm or less.

The volume of the pore having a pore diameter in the range of 0.003 μm or more to 0.02 μm or less as measured by mercury porosimetry is desirably in the range of 0.0001 mL or more to 0.02 mL or less per 1 g of the weight of the negative electrode excluding the weight of the negative electrode current collector. The reason for excluding the weight of the negative electrode current collector has been already described above. Adjusting the specific volume of the pore to be 0.0001 mL/g or more permits impregnation ability of the nonaqueous electrolyte to be improved. On the other hand, adjusting the specific volume of the pore to be 0.02 mL/g or less permits the strength of the negative electrode to be maintained to suppress pulverization of particles of the negative electrode active material when the electrode is formed by pressing. Accordingly, cycle performance and high rate loading characteristics may be improved. A more preferable range of the specific pore volume is from 0.0005 mL/g or more to 0.01 mL/g or less.

The surface area of the pore of the negative electrode having a pore diameter of 0.003 μm or more to 0.02 μm or less as measured by mercury porosimetry is desirably from 0.1 m$^2$ or more to 10 m$^2$ or less per 1 g of the weight of the negative electrode excluding the weight of the negative electrode current collector. The reason is as described below. The reason for excluding the weight of the negative electrode current collector has been already described above. Adjusting the specific surface area of the pore to be 0.1 m$^2$/g or more permits the resistance of the coating film of the negative electrode to be reduced, impregnating ability of the nonaqueous electrolyte to be improved, and self-discharge to be suppressed. The electrode density may be enhanced to improve energy density by adjusting the specific surface area of the pore to be 10 m$^2$/g or less. A more preferable range of the specific surface area of the pore is from 0.2 m$^2$/g or more to 2 m$^2$/g or less.

The pore volume of the negative electrode as measured by mercury porosimetry is desirably from 0.1 mL or more to 1 mL or less per 1 g of the negative electrode excluding the weight of the negative electrode current collector. The reason for excluding the weight of the negative electrode current collector has been described above. The pore volume of the negative electrode of 0.1 mL or more permits the amount of retention of the nonaqueous electrolyte by the negative electrode to be sufficient. The nonaqueous electrolyte may be possibly depleted in the negative electrode to decrease cycle performance or large current performance when the specific pore volume is smaller than 0.1 mL/g. The specific pore volume of the negative electrode is adjusted to be 1 ml/g or less because, when the specific pore volume is too large, distribution of the nonaqueous electrolyte tends to be biased to the negative electrode to possibly cause depletion of the nonaqueous electrolyte at the positive electrode. Accordingly, the upper limit of the specific pore volume is preferably 1.0 mL/g, and the specific pore volume is more preferably from 0.2 mL/g or more to 0.5 mL/g or less.

The surface area of the pore of the negative electrode as measured by mercury porosimetry is preferably from 5 m$^2$ or more to 50 m$^2$ or less per 1 g of the negative electrode excluding the weight of the negative electrode current collector. The reason is as described below. The reason for excluding the weight of the negative electrode current collector has been described above. The effect for improving impregnation ability at the above-mentioned pore diameter distribution can be sufficiently obtained when the specific surface area of the pore is 5 m$^2$/g or more since affinity between the negative electrode and nonaqueous electrolyte is enhanced. On the other hand, the charge-discharge cycle performance can be improved when the specific surface area of the pore is 50 m$^2$/g or less since distribution of the nonaqueous electrolyte can be equalized between the positive electrode and negative electrode. The specific surface area of the pore is more preferably in the range of 7 m$^2$/g or more to 30 m$^2$/g or less.

The porosity of the negative electrode excluding the current collector is desirably in the range of 20 to 50%. This range makes it possible to obtain a negative electrode excellent in affinity between the negative electrode and nonaqueous electrolyte and having a high density. The porosity is more preferably in the range of 25 to 40%.

The density of the negative electrode is desirably 2 g/cc or more, since the negative electrode having the above-mentioned pore diameter distribution may not be obtained when the density of the negative electrode is less than 2 g/cc. The density of the negative electrode is more preferably in the range of 2 to 2.5 g/cc.

It is desirable for the current collector of the negative electrode to be formed of aluminum foil or aluminum alloy foil. It is also desirable for the current collector to have an average crystal grain size not larger than 50 µm. In this case, the mechanical strength of the current collector can be drastically increased so as to make it possible to increase the density of the negative electrode by applying the pressing under a high pressure to the negative electrode. As a result, the battery capacity can be increased. Also, since it is possible to prevent the dissolution and corrosion deterioration of the current collector in an over-discharge cycle under an environment of a high temperature not lower than, for example, 40° C., it is possible to suppress the elevation in the impedance of the negative electrode. Further, it is possible to improve the output performance, the rapid charging performance, and the charge-discharge cycle performance of the battery. It is more desirable for the average crystal grain size of the current collector to be not larger than 30 µm, furthermore desirably, not larger than 5 µm.

The average crystal grain size can be obtained as follows. Specifically, the texture of the current collector surface is observed with an electron microscope so as to obtain the number n of crystal grains present within an area of 1 mm×1 mm. Then, the average crystal grain area S is obtained from the formula "$S=1\times10^6/n$ (µm$^2$)", where n denotes the number of crystal grains noted above. Further, the average crystal grain size d (µm) is calculated from the area S by formula (A) given below:

$$d=2(S/\pi)^{1/2} \quad (A)$$

The aluminum foil or the aluminum alloy foil having the average crystal grain size not larger than 50 µm can be complicatedly affected by many factors such as the composition of the material, the impurities, the process conditions, the history of the heat treatments and the heating conditions such as the annealing conditions, and the crystal grain size can be adjusted by an appropriate combination of the factors noted above during the manufacturing process.

It is desirable for the aluminum foil or the aluminum alloy foil to have a thickness not larger than 20 µm, more desirably not larger than 15 µm. Also, it is desirable for the aluminum foil to have a purity not lower than 99%. It is desirable for the aluminum alloy to contain another element such as magnesium, zinc or silicon. On the other hand, it is desirable for the amount of the transition metal such as iron, copper, nickel and chromium contained in the aluminum alloy to be not larger than 1%.

The negative electrode active material-containing layer may contain the conductive agent. Examples of the conductive agent available include carbonaceous materials, metal powders such as aluminum powder and conductive ceramics such as TiO. Examples of the carbonaceous material include acetylene black, carbon black, coke, carbon fiber and graphite. Coke heat-treated at 800 to 2000° C. and having an average particle diameter of 10 µm or less, graphite, TiO powder and carbon fiber with an average particle diameter of 1 µm or less are more preferable. The BET specific surface area of the carbonaceous material as measured by $N_2$ adsorption is preferably 10 m$^2$/g or more.

The negative electrode active material-containing layer may contain a binder. Examples of the binder include polytetrafluoroethylene (PTFE), polyvinylidene fluoride (PVdF), fluorinated rubber, styrene-butadiene rubber and core shell binder.

As for the blend ratios of the negative electrode active material, negative electrode conductive agent and binder, the content of the negative electrode active material is preferably from 70% by weight or more to 96% by weight or less, the content of the negative electrode conductive agent is preferably from 2% by weight or more to 28% by weight or less, and the content of the binder is preferably from 2% by weight or more to 28% by weight or less. When the content of the negative electrode conductive agent is less than 2% by weight, current collection performance of the negative electrode active material-containing layer decreases to possibly decrease large current performance of the nonaqueous electrolyte secondary battery. When the content of the binder is less than 2% by weight, bindability between the negative electrode active material-containing layer and negative electrode current collector decreases to possibly decrease cycle performance. On the other hand, the contents of the negative electrode conductive agent and binder are preferably 28% by weight or less in terms of increasing the capacity of the battery.

The negative electrode active material-containing layer is manufactured by applying a slurry, prepared by dispersing the negative electrode active material, negative electrode conductive agent and binder in a commonly used solvent, on the negative electrode current collector followed by drying, and then the negative electrode is manufactured by pressing the resultant negative electrode active material-containing layer.

For manufacturing the negative electrode having the above-mentioned pore diameter distribution, the slurry is prepared as follows. The negative electrode active material, negative electrode conductive agent and binder are added to a small amount of solvent, and the mixture is kneaded with a planetary mixer while the proportion of the solid materials, which is obtained by the proportion of the negative electrode active material, negative electrode conductive agent and binder to the solvent, is large in order to uniformly disperse the solid materials by applying a strong shear force. The shear force is small when the proportion of the solid materials is not sufficiently high, and the solid materials is not uniformly dispersed since aggregates of the negative electrode active material are not sufficiently pulverized. This step is important as the particles of the negative electrode active material are finer, and is particularly important when handling particles with an average particle diameter of 1 µm or less. After sufficiently kneading the slurry while the proportion of the solid materials is high, the proportion of the solid materials is gradually decreased by adding the solvent in order to adjust the viscosity so that the slurry may be applied. The slurry whose viscosity is adjusted to be suitable for applying is further mixed sufficiently by a beads mill using ceramic balls as mixing media. In this mixing step, the edges of the particles of the active material are scraped off to smoothen the surface of the particles of the active material. Consequently, high density packing of the particles is made possible, the pore diameter distribution may be shifted to a smaller pore diameter side, and the negative electrode having the pore diameter distribution according to the embodiment is obtained. While various materials such as glass, alumina, mullite and silicon nitride may be used as the ceramic ball, a zirconia ball is preferable in terms of abrasion resistance and impact resistance. The diameter of the ball is preferably from 0.5 to 5 mm. The impact force is reduced when the ball diameter is less than 0.5 mm, while kneading ability decreases when the ball diameter is larger than 5 mm since the contact area between the media decreases. The ball diameter is more preferably in the range of 1 to 3 mm.

The slurry obtained is applied on the negative electrode current collector, and the negative electrode is finished by pressing with a roll press machine after drying the applied slurry. The roll temperature is preferably in the range of 40 to 180° C. When the roll temperature is too low, the conductive agent having a smaller specific weight than the negative electrode active material floats on the surface of the electrode during the press step. Therefore, a high density electrode having proper size of pores is not obtained and impregnation ability of the electrolytic solution decreases while battery performance is deteriorated. When the roll temperature is higher than 180° C., on the other hand, crystallization of the binder advances to cause decrease in flexibility of the electrode. Consequently, the negative electrode active material-containing layer is readily broken or peeled. As a result, productivity as well as battery performance such as output performance and charge-discharge cycle performance are decreased. The roll temperature is more preferably in the range of 90 to 150° C.

(2) Nonaqueous Electrolyte

Examples of the nonaqueous electrolyte include a liquid nonaqueous electrolyte prepared by dissolving an electrolyte in an organic solvent, and a gel nonaqueous electrolyte formed by compounding the liquid nonaqueous electrolyte and a polymer material. In either case, the nonaqueous electrolyte contains a sultone having an unsaturated hydrocarbon group and a compound having a functional group represented by the formula (1) below in any configurations of the nonaqueous electrolyte.

[Chem.]

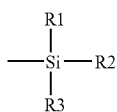

(1)

In the formula, R1 to R3 each independently represent an alkyl group having 1 to 10 carbon atoms, an alkenyl group having 2 to 10 carbon atoms or an aryl group having 6 to 10 carbon atoms.

The sultone having the unsaturated hydrocarbon group are able to stabilize the coating film on the surface of the negative electrode by being decomposed on the surface of the negative electrode. However, battery resistance increases since the coating film formed by the sultone becomes thick. It was found that the coating film on the surface of the negative electrode is stabilized and charge-discharge cycle life is improved without largely increasing the battery resistance, when the sultone having the unsaturated hydrocarbon group and the compound having the functional group represented by the formula (1) are used together. As a result, it was found that the charge-discharge cycle life is improved as compared with adding the sultone alone.

Specific examples of sultone having the unsaturated hydrocarbon group include ethylene sultone, 1,3-propene sultone, 1,4-butene sultone, 1,5-pentene sultone, 1-methyl-1,3-propene sultone, 1-fluoro-1,3-propene sultone, 2-methyl-1,3-propene sultone, 3-methyl-1,3-propene sultone, and 1-trifluoromethyl-1,3-propene sultone. One or plural kinds of sultones may be used. 1,3-propene sultone or 1,4-butene sultone, or both 1,3-propene sultone and 1,4-butene sultone are preferably used.

1,3-propene sultone is preferably used when the content of sultone in the nonaqueous electrolyte is large. Since 1,3-propene sultone has a smaller molecular weight than 1,4-butene sultone, a smaller amount of use of the former affords a large effect. In addition, since 1,3-propene sultone can form a smaller resistance of the coating film than that of 1,4-butene sultone, a battery excellent in large current performance can be obtained by using 1,3-propene sultone.

The formula of 1,3-propene sultone is shown below.

[Chem.]

1,3-propenesultone (PRS)

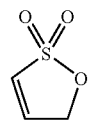

The compound having the functional group represented by the formula (1) has three, two or one functional group represented by the formula (1). Specific examples of the compound having three functional groups represented by the formula (1) include tris(trimethylsilyl)phosphate, tris(triethylsilyl)phosphate, tris(vinyldimethylsilyl)phosphate, and tris(trimethylsilyl)phosphate is preferable. Examples of the compound having two functional groups represented by the formula (1) include bis(trimethylsilyl)methyl phosphate, bis(trimethylsilyl)ethyl phosphate, bis(trimethylsilyl)-n-propyl phosphate, bis(trimethylsilyl)-i-propyl phosphate, bis(trimethylsilyl)-n-butyl phosphate, bis(trimethylsilyl)trichloroethyl phosphate, bis(trimethylsilyl)trifluoroethyl phosphate, bis(trimethylsilyl)pentafluoropropyl phosphate and bis(trimethylsilyl)phenyl phosphate. Examples of the compound having one functional group represented by the formula (1) include dimethyltrimethylsilyl phosphate, diethyltrimethylsilyl phosphate, di-n-propyltrimethylsilyl phosphate, di-i-propyltrimethylsilyl phosphate, di-n-butyltrimethylsilyl phosphate, bis(trichloroethyl)trimethylsilyl phosphate, bis(trifluoroethyl)trimethylsilyl phosphate, bis(pentafluoropropyl)trimethylsilyl phosphate and diphenyltrimethylsilyl phosphate. Either one or two kinds of the phosphate compound may be used. Tris(trimethylsilyl)phosphate is preferable among the phosphate compounds. The chemical formula of tris(trimethylsilyl)phosphate (TMSP) is shown below.

[Chem.]

Tris(trimethylsilyl)phosphate (TMSP)

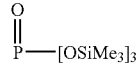

The compound of formula (1) is preferably phosphoric ester compound having a silyl. This is because lithium phosphate generated by reductive decomposition of the substance of formula (1) is stabilized on the surface of the negative electrode to contribute to formation of a desired coating film.

An example of the preferable substance among the compounds represented by formula (1) is fluorotrimethylsilane. The phosphate compound and fluorotrimethylsilane are favorably used by mixing when a positive electrode containing manganese, particularly a positive electrode containing lithium manganate having a spinel structure, is used. A preferable combination is tris(trimethylsilyl)phosphate and fluorotrimethylsilane. An organic solvent containing γ-butyrolactone (GBL) is preferably used when the phosphate compound and fluorotrimethylsilane are used by mixing.

An example of lithium manganate having the spinel structure is $Li_xMn_{2-y}M_yO_4$ (0≤x≤1.2, 0≤y≤1, M is an element other than Mn).

The above-mentioned phosphate compound may be modified into fluorotrimethylsilane by reacting with an acid such as fluoric acid generated in the battery. Fluorotrimethylsilane obtained by chemical modification of the phosphate compound also contributes to the effect of the embodiments of the invention.

Sultone having the unsaturated hydrocarbon group is able to form a stable coating film by being appropriately reduced on the surface of the negative electrode. Since the coating film is able to suppress excess decomposition of the nonaqueous electrolyte that occurs on the surface of the negative electrode, the resistance of the coating film at the negative electrode can be suppressed from increasing. Consequently, increase in the resistance due to the progress of the charge-discharge cycle can be suppressed, thereby suppressing deterioration of the battery. As a result, a long cycle life battery can be obtained. However, since the resistance of the coating film itself formed by adding sultone is large, transfer of electrons and lithium ions are blocked by adding an excess amount of sultone to the nonaqueous electrolyte to result in an increase in the resistance of the negative electrode and deterioration of large current performance of the battery.

On the other hand, the compound having the group represented by formula (1) is decomposed at a nobler potential than the decomposition potential of sultone, and exhibits an effect for suppressing excess decomposition of sultone. A reaction for forming a coating film by reductive decomposition on the surface of the negative electrode occurs in preference to the decomposition of sultone. Since this coating film has a small charge transfer resistance, lithium ions can be smoothly absorbed or released into the negative electrode to enable an initial resistance of the battery to be reduced. However, since the compound has low conductivity, it is apprehended that large current performance of the battery may decrease by adding an excess amount of the compound to the nonaqueous electrolyte.

Accordingly, the preferable content of sultone is in the range of 0.1 to 2% by weight, more preferably in the range of 0.5 to 1.5% by weight. The preferable content of the compound represented by formula (1) is in the range of 0.1 to 10% by weight, more preferably in the range of 1 to 5% by weight.

Whether sultone and the compound represented by formula (1) are contained in the nonaqueous electrolyte can be determined with TG-MS (thermogravimetry-mass spectrometer) or heat-decomposition MS (mass spectrometer). Specifically, the nonaqueous electrolyte as a sample is heated to generate gases, which are analyzed to detect combustible gases generated.

GC and NMR (nuclear magnetic resonance spectroscopy) may be used for measuring the volume ratio of each component contained in the nonaqueous electrolyte.

Examples of the electrolyte include lithium salts such as lithium perchlorate ($LiClO_4$), lithium hexafluorophosphate ($LiPF_6$), lithium tetrafluoroborate ($LiBF_4$), lithium hexafluoroarsenate ($LiAsF_6$), lithium trifluoromethanesulfonate ($LiCF_3SO_3$) and bistrifluoromethylsulfonylimide lithium [$LiN(CF_3SO_2)_2$]. Either one or plural kinds of the electrolyte may be used. The electrolyte is preferably difficult to be oxidized even under a high electric potential, and $LiPF_6$ is most preferable.

The concentration of the electrolyte in the organic solvent is desirably from 0.5 mol/L or more to 2.5 mol/L or less as the liquid nonaqueous electrolyte.

Examples of the organic solvent may include single or mixed solvents of cyclic carbonates such as propylene carbonate (PC), ethylene carbonate (EC) and vinylene carbonate; chain carbonates such as diethyl carbonate (DEC), dimethyl carbonate (DMC) and methyl ethyl carbonate (MEC); cyclic ethers such as tetrahydrofuran (THF), 2-methyltetrahydrofuran (2MeTHF) and dioxolan (DOX); chain ethers such as dimethoxyethane (DME) and diethoxyethane (DEE); γ-butyrolactone (GBL); acetonitrile (AN); and sulfolane (SL).

Examples of the preferable organic solvent include mixed solvents prepared by mixing two or more solvents of the group consisting of diethyl carbonate (DEC), propylene carbonate (PC) and γ-butyrolactone (GBL). γ-butyrolactone (GBL) is more preferable for the following reasons.

First, γ-butyrolactone, DEC and PC have high boiling point and flash point, and are excellent in heat stability.

Second, γ-butyrolactone is more readily reduced than linear carbonates and cyclic carbonates. Accordingly, a more stable protective coating film may be formed in combination with a sultone having an unsaturated hydrocarbon group.

γ-butyrolactone is slightly decomposed at a working potential region of lithium-titanium oxide, and a desired coating film is formed on the surface of the lithium-titanate oxide. A stable coating film having low resistance is formed on the surface of the negative electrode active material by a competitive reaction among γ-butyrolactone, the compound having the functional group represented by the formula (1) and the sultone having an unsaturated hydrocarbon group. Consequently, high temperature storage characteristics of the nonaqueous electrolyte battery such as suppression of self-discharge can be improved.

The same holds true for the above-mentioned mixed solvent.

The same effect may be obtained in a readily reducible ionic liquids. Since the ionic liquid is also readily oxidized, the ionic liquid has an effect for suppressing self-discharge and for improving cycle life by acting on the positive electrode.

The content of γ-butyrolactone in the organic solvent is preferably in the range of 40% by volume or more to 95% by volume or less for forming a protective film having better performance.

While the non-aqueous electrolytic solution containing γ-butyrolactone exhibits the above-mentioned excellent effect, the viscosity of the solution is so high that impregnation ability into the electrode decreases. However, the electrolytic solution can be smoothly impregnated into the electrode even by using the nonaqueous electrolytic solution containing γ-butyrolactone when the negative electrode active material used has an average particle diameter of 1 μm or less. Accordingly, productivity as well as output performance and charge-discharge cycle life may be improved. The same effect may be obtained when an ionic liquid having higher viscosity is used.

Examples of the polymer material used for the gel nonaqueous electrolyte include polyvinylidene fluoride (PVdF), polyacrylonitrile (PAN) and polyethylene oxide (PEO).

The nonaqueous electrolyte used may contain a nonvolatile and nonflammable ionic liquid.

The ionic liquid refers to a salt at least a part of which is a liquid at room temperature, and room temperature refers to a temperature range where the battery is conjectured to work usually as a power source. The upper limit of the temperature range where the battery is conjectured to work usually as a power source is about 120° C., optionally about 60° C., and the lower limit thereof is about −40° C., optionally about −20° C. The temperature range of −20° C. or more to 60° C. or less is suitable.

An ionic liquid containing lithium ion, and organic cations and anions is desirably used as the ionic liquid containing lithium ion. The ionic liquid is preferably a liquid at a temperature below room temperature.

Examples of the organic cation include alkyl imidazolium ion and quaternary ammonium ion having a skeleton represented by the formula 2 below.
[Chem.]

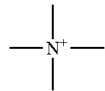

Chemical formula (2)

As the alkylimidazolium ion, a dialkyl imidazolium ion, trialkyl imidazolium ion, tetraalkyl imidazolium ion and the like are preferable. As the dialkyl imidazolium ion, 1-methyl-3-ethylimidazolium ion (MEI$^+$) is preferable. As the trialkyl imidazolium ion, 1,2-diethyl-3-propylimidazolium ion (DMPI$^+$) is preferable and as the tetraalkyl imidazolium ion, 1,2-diethyl-3,4(5)-dimethylimidazolium ion is preferable.

As the above quaternary ammonium ion, a tetraalkylammonium ion, cyclic ammonium ion and the like are preferable. As the tetraalkylammonium ion, a dimethylethylmethoxyammonium ion, dimethylethylmethoxymethylammonium ion, dimethylethylethoxyethylammonium ion and trimethylpropylammonium ion are preferable.

The use of the above alkylimidazolium ion or quaternary ammonium ion (particularly, tetraalkylammonium ion) ensures that the melting point of the ionic liquid may be made to be 100° C. or less and more preferably 20° C. or less. Also, the reactivity with the negative electrode can be decreased.

The concentration of the above lithium ion is preferably 20 mol % or less and more preferably in the range of 1 to 10 mol %. When the concentration of the lithium ion is in the above range, an ionic liquid can be obtained even at a temperature as low as 20° C. or less. Also, the viscosity of the ionic liquid can be dropped even at a temperature lower than room temperature and ion conductivity can be increased.

As the above anion, one or more anions selected from $BF_4^-$, $PF_6^-$, $AsF_6^-$, $ClO_4^-$, $CF_3SO_3^-$, $CF_3COO^-$, $CH_3COO^-$, $CO_3^{2-}$, $N(CF_3SO_2)_2^-$, $N(C_2F_5SO_2)_2^-$, and $(CF_3SO_2)_3C^-$ are preferably made to coexist. When plural anions are made to coexist, an ionic liquid having a melting point of 20° C. or less can be easily produced. It is more preferable that an ionic liquid having a melting point of 0° C. or less can be produced. More preferable examples of the anion include $BF_4^-$, $CF_3SO_3^-$, $CF_3COO^-$, $CH_3COO^-$, $CO_3^{2-}$, $N(CF_3SO_2)_2^-$, $N(C_2F_5SO_2)_2^-$, and $(CF_3SO_2)_3C^-$. The use of these anions makes it easy to form an ionic liquid having a melting point of 0° C. or less.

(3) Positive Electrode

The positive electrode comprises a positive electrode current collector, and a positive electrode active material-containing layer retained on one surface or both surfaces of the positive electrode current collector and containing a positive electrode active material, a positive electrode conductive agent and a binder.

Examples of the positive electrode active material include oxides, sulfides and polymers.

Examples of the oxide include manganese dioxide ($MnO_2$) in which Li is occluded, iron oxide, copper oxide, nickel oxide, iron sulfate (for example $Fe_2(SO_4)_3$), vanadium oxide (for example $V_2O_5$) and lithium-transition metal composite oxide.

Examples of the lithium-transition metal composite oxide include lithium-manganese composite oxide (for example $Li_xMn_2O_4$ or $Li_xMnO_2$), lithium-nickel composite oxide (for example $Li_xNiO_2$), lithium-cobalt composite oxide (for example $Li_xCoO_2$), lithium-nickel-cobalt composite oxide (for example $Li_xNi_{1-y}Co_yO_2$), lithium-manganese-cobalt composite oxide ($Li_xMn_yCo_{1-y}O_2$), spinel type lithium-manganese-nickel composite oxide (for example $Li_xMn_{2-y}Ni_yO_4$), lithium phosphate having an olivine structure (for example $Li_xFePO_4$, $Li_xFe_{1-y}Mn_yPO_4$ and $Li_xCoPO_4$) and lithium-nickel-cobalt-manganese composite oxide, where x and y are preferably in the range of 0 to 1.

The composition of the lithium-nickel-cobalt-manganese composite oxide is preferably represented by $Li_aNi_bCo_cMn_dO_2$ (where molar ratios a, b, c and d are preferably 0≤a≤1.1, 0.1≤b≤0.5, 0≤c≤0.9 and 0.1≤d≤0.5, respectively).

Examples of the polymer include conductive polymer materials such as polyaniline and polypyrrole, and disulfide polymer materials. Sulfur (S) and fluorinated carbon may also be used.

Example of the positive electrode active material that is able to obtain high positive electrode potential include lithium-manganese composite oxide, lithium-nickel composite oxide, lithium-cobalt composite oxide, lithium-nickel-cobalt composite oxide, spinel type lithium-manganese-nickel composite oxide, lithium-manganese-cobalt composite oxide, lithium-iron phosphate (for example $Li_xFePO_4$) and lithium-nickel-cobalt-manganese composite oxide.

Using lithium-iron phosphate, $Li_xVPO_4F$, lithium-manganese composite oxide, lithium-nickel composite oxide or lithium-nickel-cobalt composite oxide is preferable in terms of cycle life when using the nonaqueous electrolyte containing the ionic liquid. This is because reactivity between the positive electrode active material and ionic liquid is reduced.

At least a part of the surface of the particles of the lithium-transition metal composite oxide is preferably coated with an oxide of at least one element selected from Al, Mg, Zr, B, Ti and Ga. Examples of the oxide include $Al_2O_3$, MgO, $ZrO_2$, $B_2O_3$, $TiO_2$ and $Ga_2O_3$. Forming the coating film of these oxides suppresses oxidative decomposition of the nonaqueous electrolyte on the surface of the positive electrode active material. Since the solvent of the nonaqueous electrolyte as well as the above-mentioned sultones and compounds are oxidatively decomposed in this embodiment, oxidative decomposition of the sultones and compounds can be suppressed by using the positive electrode active material in which at least a part of the surface thereof is coated with these oxides, and the battery may have long cycle life.

While the oxide of at least one element selected from Al, Mg, Zr, B, Ti and Ga may be used in any mass ratio relative to the lithium-transition metal composite oxide, it is preferably contained in a proportion of 0.5 to 15% by weight, more preferably 1 to 5% by weight, in the final lithium-transition metal composite oxide. An effect for suppressing oxidative decomposition of the nonaqueous electrolyte by the positive electrode active material can be obtained when the proportion of the oxide of at least one element selected from Al, Mg, Zr, B, Ti and Ga is controlled to be 0.5% by weight or more. In addition, the oxide prevents performance of the nonaqueous electrolyte battery from being adversely affected when the proportion of the oxide of at least one element selected from Al, Mg, Zr, B, Ti and Ga is controlled to be 15% by weight or less. While only the lithium-transition metal composite oxide at least a part of the surface of which is covered with the oxide of at least one element selected from Al, Mg, Zr, B, Ti and Ga may be used as the positive electrode active material, the positive electrode active material may contain particles of the lithium-transition metal composite oxide on which the oxide of at least one element selected from Al, Mg, Zr, B, Ti and Ga is not adhered. The composition of the lithium-transition metal composite oxide used for the positive electrode active material is not restricted to those described above, and may contain inevitable impurities.

MgO, $ZrO_2$ or $B_2O_3$ may be used as an oxide in the most preferable embodiment of the invention. Using the particles of the lithium-transition metal composite oxide containing the above-mentioned oxide as the positive electrode active material permits the charging voltage to be increased to 4.4V, and charge-discharge cycle performance can be improved.

The shape of the oxide (referred to as the surface oxide hereinafter) formed on the surface of the particles of the lithium-transition metal composite oxide is not particularly restricted, and examples thereof include granular or lamellar. The lamellar shape is preferable among them, because the contact area between the nonaqueous electrolyte and particles of the lithium-transition metal composite oxide may be reduced to consequently suppress oxidative decomposition of the nonaqueous electrolyte that degrades battery performance.

The crystal structure of the surface oxide is not restricted to the lamellar structure. The crystal structure of the surface oxide differs depending on the constituting elements and compositions. When the crystal structure of the lithium-transition metal composite oxide is lamellar and is covered with the surface oxide such as $B_2O_3$, a lamellar solid solution phase such as $LiBO_2$ is preferably formed at the interface. This is because the solid solution phase relaxes the stress caused by lattice mismatch between the surface oxide and lithium-transition metal composite oxide to make it difficult to cause elimination or collapse of the surface oxide.

The positive electrode active material may be synthesized by baking the particles of the lithium-transition metal composite oxide after impregnating the particles of the lithium-transition metal composite oxide with an aqueous solution containing at least one ion selected from the group consisting of Al, Mg, Zr, B, Ti and Ga. The configuration of the aqueous solution used for impregnation is not particularly restricted as long as an oxide of at least one element selected from the group consisting of Al, Mg, Zr, B, Ti and Ga adheres on the surface of the lithium-transition metal composite oxide after baking. An aqueous solution containing at least one of the ions selected from Al, Mg, Zr, B, Ti and Ga in an appropriate configuration may be used. Examples of the configuration of these metals (including boron) include oxynitrate of at least one element (referred to as element M hereinafter) selected from the group consisting of Al, Mg, Zr, B, Ti and Ga, nitrate of element M, acetate of element M, sulfate of element M, carbonate of element M, hydroxide of element M or an acid of element M. Since the most preferable configuration of the positive electrode active material is to use MgO, $ZrO_2$ or $B_2O_3$ as an oxide, the ion of element M is more preferably Mg ion, Zr ion or B ion. An aqueous solution of $Mg(NO_3)_2$, an aqueous solution of $ZrO(NO_3)_2$, an aqueous solution of $ZrCO_4.ZrO_2.8H_2O$, an aqueous solution of $Zr(SO_4)_2$ or an aqueous solution of $H_3BO_3$ is preferably used as the aqueous solution containing the ion of element M, and using the aqueous solution of $Mg(NO_3)_2$, the aqueous solution of $ZrO(NO_3)_2$, or the aqueous solution of $H_3BO_3$ is most preferable. Concentration of the aqueous solution containing the ion of element M is not particularly restricted, but a saturated solution is preferably used since the volume of the solution can be made smaller at the impregnation step. The configuration of element M in the aqueous solution includes not only the ion formed from element M itself, but also an ionic state bonded to other elements, for example $B(OH)_4^-$ in the case of boron, in this embodiment.

In the method for producing the positive electrode active material described above, the mass ratio between the particles of the lithium-transition metal composite oxide and aqueous solution when impregnating the particles of the lithium-transition metal composite oxide with the aqueous solution containing the ion of element M is not particularly restricted, and the mass ratio may be determined depending on the composition of the lithium-transition meal composite oxide to be produced. The impregnation time may be a time sufficient for impregnation, and the impregnation temperature is not particularly restricted.

The lithium-transition metal composite oxide is obtained by baking the particles subjected to impregnation. While the baking temperature and baking time in this step may be appropriately determined in the range suitable for baking, the impregnated particles are preferably baked at 400 to 800° C. for 1 to 5 hours, more preferably at 600° C. for 3 hours. The particles may be baked either in oxygen stream or in air. While the particles subjected to impregnation treatment may be directly baked, it is preferable to dry the particles before baking for eliminating water in the mixture. The particles may be dried by a method known in the art, and either heating in an oven or drying in hot air stream may be used alone, or combination of both methods may be used. Drying is preferably performed in an oxygen atmosphere or in air.

The lithium-transition metal composite oxide thus obtained may be optionally pulverized.

Examples of the positive electrode active material for the primary battery include manganese dioxide, iron oxide, copper oxide, iron sulfide and fluorinated carbon.

The primary particle diameter of the positive electrode active material is preferably in the range of 100 nm or more to 1 μm or less. Particles with a primary particle diameter of 100 nm or more is easily handled in industrial production. Particles with a primary particle diameter of 1 μm or less permits diffusion of the lithium ion in the solid to be smoothly advanced.

The specific surface area of the positive electrode active material is preferably from 0.1 $m^2/g$ or more to 10 $m^2/g$ or less. A sufficient number of absorption-desorption sites of the lithium ion may be ensured when the specific surface area is 0.1 $m^2/g$ or more. The positive electrode active material is easily handled in the industrial scale production when the specific surface area is 10 $m^2/g$ or less to ensure good charge-discharge cycle performance.

Example of the positive electrode conductive agent that is able to enhance current collecting ability and to suppress contact resistance with the current collector include carbonaceous materials such as acetylene black, carbon black and graphite.

Examples of the binder for bonding the positive electrode active material with the positive electrode conductive agent include polytetrafluoroethylene (PTFE), polyvinylidene fluoride (PVdF) and fluorinated rubber.

The blending ratio of the positive electrode active material, positive electrode conductive agent and binder is preferably in the ranges of 80% by weight or more to 95% by weight or less for the positive electrode active material, 3% by weight or more to 18% by weight or less for the positive electrode conductive agent, and 2% by weight or more to 17% by weight or less for the binder. The positive electrode conductive agent in a proportion of 3% by weight or more permits the above-mentioned effect to be exhibited, while that of 18% by weight or less reduces decomposition of the nonaqueous electrolyte on the surface of the positive electrode conductive agent during storage at high temperatures. The binder in the proportion of 2% by weight or more permits an electrode having a sufficient strength to be obtained, while the binder in the proportion of 17% by weight or less reduces the amount of blending of the insulator of the electrode so as to lower internal resistance.

The positive electrode is produced by dispersing the positive electrode active material, positive electrode conductive agent and binder in an appropriate solvent, applying the dispersed slurry on the positive electrode current collector, and preparing a positive electrode active material-containing layer by drying the coated slurry, followed by press-molding of the layer. Alternatively, the positive electrode active material, positive electrode conductive agent and binder may be molded into a pellet that is used as the positive electrode active material-containing layer.

It is desirable for the current collector to be formed of an aluminum foil or an aluminum alloy foil. It is desirable for the aluminum foil or the aluminum alloy foil forming the current collector to have an average crystal grain size not larger than 50 µm. It is more desirable for the average crystal grain size noted above to be not larger than 30 µm, and furthermore desirably not larger than 5 µm. Where the average crystal grain size of the aluminum foil or the aluminum alloy foil forming the current collector is not larger than 50 µm, the mechanical strength of the aluminum foil or the aluminum alloy foil can be drastically increased to make it possible to press the positive electrode with a high pressure. It follows that the density of the positive electrode can be increased to increase the battery capacity.

The aluminum foil or the aluminum alloy foil having the average crystal grain size not larger than 50 µm can be affected in a complicated fashion by many factors such as the composition of the material, the impurities, the process conditions, the history of the heat treatments and the heating conditions such as the annealing conditions, and the crystal grain size can be adjusted by an appropriate combination of the factors noted above during the manufacturing process.

It is desirable for the aluminum foil or the aluminum alloy foil to have a thickness not larger than 20 µm, preferably not larger than 15 µm. Also, it is desirable for the aluminum foil to have a purity not lower than 99%. Further, it is desirable for the aluminum alloy to contain, for example, magnesium, zinc and silicon. On the other hand, it is desirable for the content of the transition metals such as iron, copper, nickel and chromium in the aluminum alloy to be not higher than 1%.

(4) Separator

Examples of the separator include porous films of synthetic resins and nonwoven fabric of synthetic resins. The synthetic resins includes polyethylene, polypropylene, cellulose and polyvinylidene fluoride (PVdF). The porous film made of polyethylene or polypropylene is preferable in terms of improvement of safety since it melts at a given temperature to cut off current.

It was found that distribution of the pore diameter of the separator is correlated with large current performance, storage resistance at high temperatures and durability of charged states of the nonaqueous electrolyte battery. In particular, distribution of the pore diameter of the separator is highly correlated with durability of charged states.

It was found that large current performance of the nonaqueous electrolyte battery is improved when pores having a large diameter are formed in the separator, namely, when a median diameter is larger than a mode diameter in the distribution of the pore diameter of the separator. The lithium ion absorption potential can be 0.4V (vs. Li/Li$^+$) or higher by using titanium-containing oxide as the negative electrode active material. Therefore, precipitation of metallic lithium on the surface of the negative electrode can be suppressed even when pores with a large diameter are formed in the separator, and as a result internal short circuit is prevented.

Large current performance can be improved without causing internal short circuit by using a separator having the distribution of the pore diameter of the separator in which the median diameter is larger than the mode diameter, and by allowing the negative electrode active material to contain titanium-containing oxides.

Storage resistance at higher temperatures is remarkably improved when the separator having the above-mentioned properties and the negative electrode active material are used together. The reason is as follows.

Resistance of the separator increases when it is exposed to a high temperature environment, or when it is exposed to high potential environment or oxidative atmosphere. Resistance of the separator increases by separator's own denaturation, by deposition of reaction products as a result of side reactions on the surface of the electrode, and by clogging of the separator as a result of the side reactions, and battery performance decreases. A part of decomposition products formed at the interface between the positive electrode and nonaqueous electrolyte is liable to deposit on the surface of the negative electrode having low potential.

According to the configuration of this embodiment, the decomposition product is hardly deposited at the negative electrode since the potential of the negative electrode is high, and plugging of the separator in contact with the negative electrode as well as plugging by the separator's own denaturation can be suppressed. Accordingly, decrease in large current performance can be remarkably suppressed even when the battery is exposed to a high temperature environment for a long period of time in a charged state.

In the separator, the median diameter of pores when measured by mercury porosimetry is preferably 0.15 µm or more and 1 µm or less. When the median diameter is less than 0.15 µm, the film resistance of the separator is increased, resulting in low output. Also, when the median diameter of pores exceeds 1 µm, the current shutdown unequally occurs in the separator, leading to reduced safety, and besides, the diffusion of the nonaqueous electrolyte due to a capillary phenomenon is scarcely caused, inducing a cycle deterioration due to a shortage of the nonaqueous electrolyte. The median diameter of pores is more preferably in the range of 0.18 μm or more and 0.40 μm or less.

With regard to the separator, the mode diameter of pores when measured by mercury porosimetry is preferably 0.12 μm or more and 0.5 μm or less. When the mode diameter is less than 0.12 μm, the film resistance of the separator is increased, resulting in low output. Also, the separator is denatured under a high-temperature and high-voltage circumstance so that pores are clogged, with the result that the output is reduced. Further, when the mode diameter of pores exceeds 0.5 μm, the current shutdown unequally occurs in the separator, leading to low safety. The mode diameter of pores is more preferably in the range of 0.18 μm or more and 0.35 μm or less.

The porosity of the separator is preferably 45% or more and 75% or less. When the porosity is less than 45%, the absolute amount of ions in the separator is small and therefore the output is reduced. When the porosity exceeds 75%, the strength of the separator is reduced and also, the current shutdown unequally occurs in the separator, leading to low safety. The porosity is more preferably in the range of 50% to 60%.

5) Outer Package Member

Examples of the outer package member include a laminate film case having a wall thickness of 0.2 mm or less and a metal case having a wall thickness of 0.5 mm or less. The wall thickness of the metal case is more preferably 0.2 mm or less.

Examples of the shape of the outer package member include a flat type, rectangular type, cylinder type, coin type, button type, sheet type and laminate type. As to the nonaqueous electrolyte battery, of course, small batteries to be mounted on portable electronic devices and large batteries to be mounted on two-wheel to four-wheel cars may be included.

The laminate film is a multilayer film consisting of a metal layer and a resin layer with which the metal layer is coated. To develop a light-weight battery, the metal layer is preferably an aluminum foil or an aluminum alloy foil. The resin layer serves to reinforce the metal layer and polymers such as polypropylene (PP), polyethylene (PE), nylon and polyethylene terephthalate (PET) may be used. The laminate film case may be formed by carrying out thermal fusion to seal the laminate film.

Examples of the material of the metal case include aluminum and aluminum alloys. As the aluminum alloy, alloys containing an element such as magnesium, zinc or silicon are preferable. On the other hand, the content of transition metals such as iron, copper, nickel or chromium is preferably designed to be 1% or less. This makes it possible to outstandingly improve long-term reliability in a high-temperature condition and radiation ability.

A metal can made of aluminum or an aluminum alloy has an average crystal grain size of preferably 50 μm or less, more preferably 30 μm or less and still more preferably 5 μm or less. When the above average crystal grain size is designed to be 50 μm or less, the strength of the metal can made of aluminum or an aluminum alloy can be increased outstandingly, enabling the can to be more thinned. As a result, a battery can be realized which is light-weight, has high output, is excellent in long-term reliability and is appropriately mounted on vehicles.

6) Negative electrode terminal

The negative electrode terminal may be formed from a material having electric stability and conductivity at a potential range from 0.4 to 3V with respect to a lithium metal potential. Example of this material include aluminum and aluminum alloys containing elements such as Mg, Ti, Zn, Mn, Fe, Cu and Si. In order to reduce contact resistance, the material is preferably the same as that of the negative electrode current collector.

7) Positive Electrode Terminal

The positive electrode terminal may be formed from a material having electric stability and conductivity at a potential range from 3V to 5V with respect to a lithium metal potential. Example of this material include aluminum and aluminum alloys containing elements such as Mg, Ti, Zn, Mn, Fe, Cu and Si. In order to reduce contact resistance, the material is preferably the same as that of the positive electrode current collector.

Figure 3:
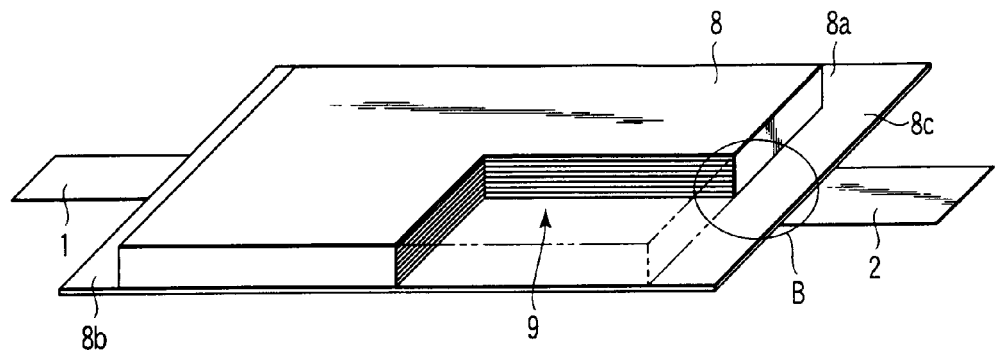
FIG. 3 shows a partially cut perspective view of another nonaqueous electrolyte battery according to the first embodiment.
Figure 4:
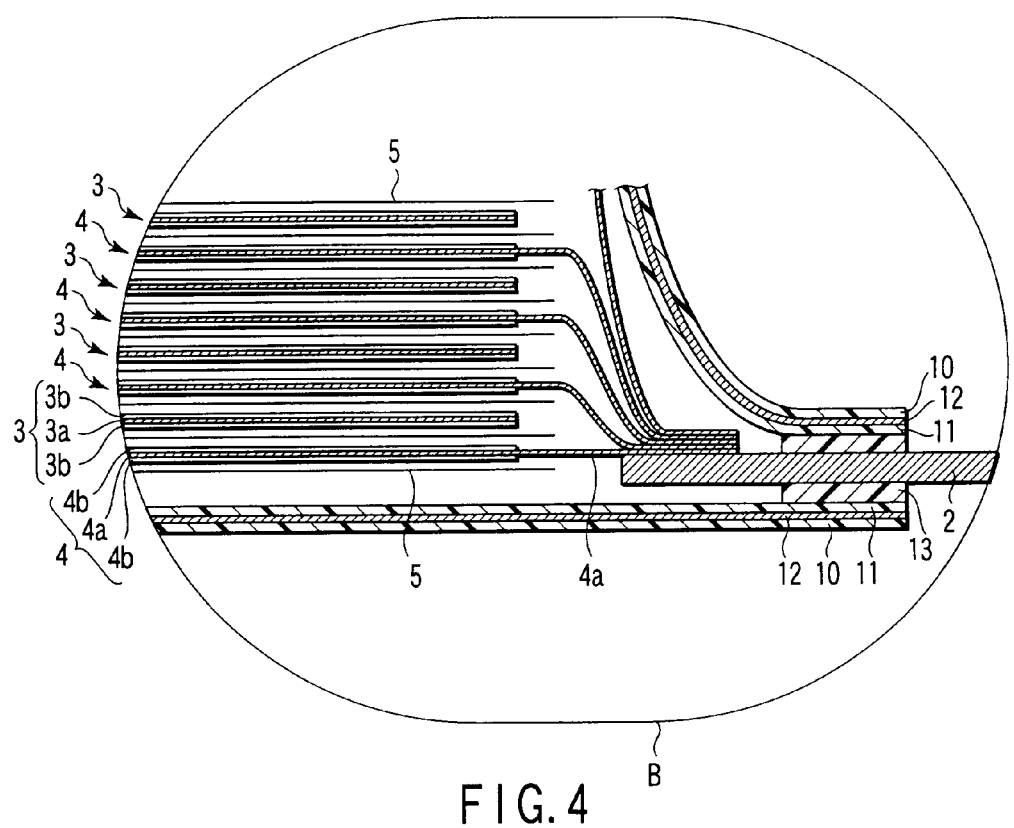
FIG. 4 shows a partial schematic cross section of a detailed structure of the portion surrounded by circle B in FIG. 3.

The nonaqueous electrolyte battery according to this embodiment is not restricted to that having the structure shown in FIGS. 1 and 2, and the structure shown in FIGS. 3 and 4 may be also available. FIG. 3 shows a partially cut perspective view of another flat nonaqueous electrolyte secondary battery according to the embodiment, and FIG. 4 shows an enlarged cross section of the portion surrounded by circle B in FIG. 3.

As shown in FIG. 3, a laminate type electrode group 9 is housed in an outer package member 8 made of a laminate film. The laminate film is provided with a resin layer 10, a thermoplastic resin layer 11, and a metal layer 12 disposed between the resin layer 10 and the thermoplastic resin layer 11 as shown in FIG. 4. The thermoplastic resin layer 11 is positioned on the inside surface of the outer package member 8. Heat seal parts 8a, 8b and 8c are formed by thermal fusion of the thermoplastic resin layer 11 on one long side and both short sides of the outer package member 8 made of a laminate film. The outer package member 8 is sealed by these heat seal parts 8a, 8b and 8c.

The laminate type electrode group 9 comprises plural positive electrodes 3, plural negative electrodes 4 and a separator 5 interposed between each positive electrode 3 and each negative electrode 4. The laminate type electrode group 9 has a structure in which the positive electrode 3 and the negative electrode 4 are alternately laminated with the separator 5 interposed therebetween as shown in FIG. 4. Each positive electrode 3 comprises a positive electrode current collector 3a and a positive electrode active material-containing layer 3b supported on both surfaces of the positive electrode current collector 3a. Each negative electrode 4 comprises a negative electrode current collector 4a and a negative electrode active material-containing layer 4b supported on both surfaces of the negative electrode current collector 4a. One short side of each of the negative electrode current collectors 4a of the negative electrodes 4 is projected from the positive electrode 3. The negative electrode current collector 4a projected from the positive electrode 3 is electrically connected to a band-like negative electrode terminal 2. The end of the band-like negative electrode terminal 2 is drawn externally through the heat seal part 8c of the outer package member 8. Both surfaces of the negative electrode terminal 2 face the thermoplastic resin layer 11 constituting the heat seal part 8c. An insulating film 13 is interposed between each surface of the negative electrode terminal 2 and the thermoplastic resin layer 11 to improve the binding strength between the heat seal part 8c and the negative electrode terminal 2. Examples of the insulating film 13 may include films formed from materials obtained by adding an acid anhydride to polyolefin containing at least one of polypropylene and polyethylene.

Though not shown here, one short side of each of the positive electrode current collectors 3a of the positive electrodes 3 is projected from the negative electrode 4. The positive electrode current collector 3a and the negative electrode current collector 4a are projected in directions opposite to each other. The positive electrode current collector 3a projected from the negative electrode 4 is electrically connected to the band-like positive electrode terminal 1. The end of the band-like positive electrode terminal 1 is drawn externally through the heat seal part 8b of the outer package member 8. In order to improve the binding strength between the heat seal 8b and the positive electrode terminal 1, an insulating film 13 is interposed between the positive electrode terminal 1 and the thermoplastic resin layer 11. The positive electrode terminal 1 and the negative electrode terminal 2 are drawn in directions opposite to each other from the outer package member 8.

Figure 5:
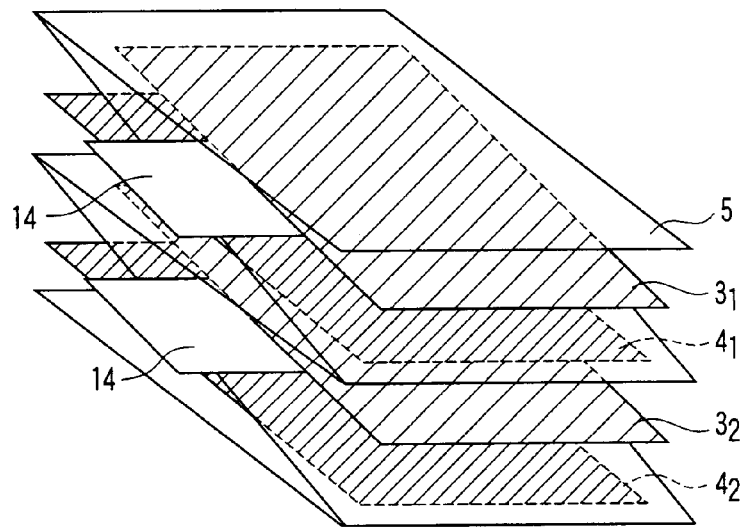
FIG. 5 shows a schematic perspective view of an electrode group of the laminated structure used in the nonaqueous electrolyte battery according to the first embodiment.

An example of a unit cell of the nonaqueous electrolyte battery according to the first embodiment has been described with reference to FIGS. 1 and 2 in which the electrode group including the positive electrode and negative electrode has a coiled shape. However, the electrode group preferably has a laminated structure so that the battery has excellent large current performance and charge-discharge cycle performance as the effect of the embodiment as well as high safety and reliability together. While strips or bags of the separator may be used in the electrode group having the laminated structure as shown in FIGS. 3 and 4, the separator may have a zigzag structure as shown in FIG. 5. A band-shaped separator 5 is folded in a zigzag shape. A strip-like positive electrode $3_1$, a strip-like negative electrode $4_1$, a strip-like positive electrode $3_2$ and a strip-like negative electrode $4_2$ are inserted in this order from above into the overlapped part of the separators 5. A positive electrode terminal 14 is drawn from each short side of the strip-like positive electrodes $3_1$ and $3_2$. An electrode group having a laminate structure is obtained by alternately disposing the positive electrode 3 and the negative electrode 4 between the overlapped parts of the separator 5 folded in a zigzag shape in this manner.

When the separator is folded in a zigzag shape, three sides of each of the positive electrode and negative electrode are brought into direct contact with the nonaqueous electrolyte not through the separator and therefore, the nonaqueous electrolyte is smoothly moved to the electrode. Therefore, even if the nonaqueous electrolyte is consumed on the surface of the electrode during long-term use, the nonaqueous electrolyte is smoothly supplied, with the result that an excellent large-current performance (output/input performance) can be attained over a long period of time.

Figure 6:
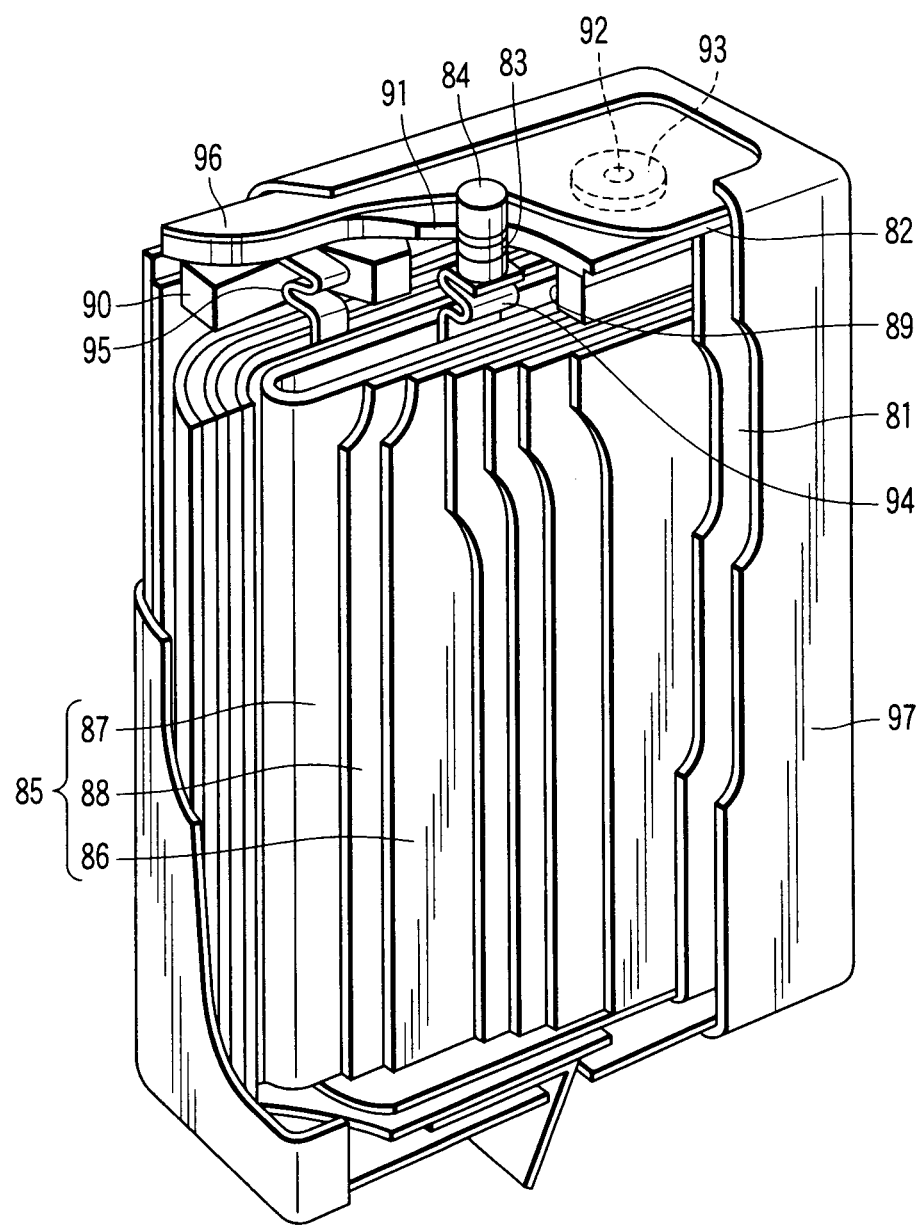
FIG. 6 shows a partially cut perspective view of a rectangular nonaqueous electrolyte battery according to the first embodiment.

The case made of a laminate film as shown in FIGS. 1 to 4 is not always used for the nonaqueous electrode battery according to the embodiment, and a metal case as shown in FIG. 6 may also be used.

The outer package member includes a case 81 made of aluminum or aluminum alloy and having a rectangular cylindrical shape with a bottom, a lid 82 disposed at the opening of the case 81, and a negative electrode terminal 84 attached at the lid 82 via an insulation material 83. The case 81 also serves as a positive electrode terminal. Aluminum or an aluminum alloy having the above-mentioned composition and average crystal grain size may be used for the case 81.

An electrode group 85 is housed in the case 81. The electrode group 85 has a structure in which a positive electrode 86 and a negative electrode 87 are coiled in a flat shape with a separator 88 disposed therebetween. This electrode group 85 is obtained in the following manner: for example, a band-like product obtained by laminating the positive electrode 86, the separator 88 and the negative electrode 87 in this order is coiled in a spiral form by using a plate or cylindrical core such that the positive electrode 86 is positioned on the outside, and the obtained coiled product is molded under pressure in the radial direction.

The nonaqueous electrolytic solution (liquid nonaqueous electrolyte) is retained in the electrode group 85. A spacer 90 made of a synthetic resin having a lead outlet hole 89 near the center is disposed on the electrode group 85 in the case 81.

An outlet hole 91 of the negative electrode terminal 84 is open near the center of the lid 82. A liquid injection port 92 is provided at a position remote from the outlet hole 91 of the lid 82. The liquid injection port 92 is hermetically sealed with a sealing plug 93 after injecting the liquid nonaqueous electrolyte into the case 81. The negative electrode terminal 84 is hermetically sealed at the outlet hole 91 of the lid 82 with interposition of the insulation material 83 made of a glass or resin.

A negative electrode lead tab 94 is welded to the lower surface of the negative electrode terminal 84. The negative electrode lead tab 94 is electrically connected to the negative electrode 87. One end of a positive electrode lead 95 is electrically connected to the positive electrode 86, and the other end thereof is welded to the bottom face of the lid 82. The outer surface of the lid 82 is covered with an insulation paper sheet 96. An outer package tube 97 covers the entire side face of the case 81, and the upper and lower ends thereof are folded onto the upper surface and lower surface, respectively, of the battery.

Second Embodiment

A battery pack according to a second embodiment has a plurality of the nonaqueous electrolyte batteries according to the first embodiment as unit cells. The unit cells are electrically connected in series or in parallel to form a battery module.

The unit cell according to the first embodiment is suitable for the battery module, while the battery pack according to the second embodiment is excellent in cycle performance. Explanations will be furnished concerning this reason.

It is possible to largely reduce differences in capacity and impedance among respective unit cells when large current performance and charge-discharge cycle performance of the nonaqueous electrolyte battery are improved. As a result, fluctuation of the voltage of the unit cell at a fully charged state due to individual difference of the capacity can be reduced, for example, in the battery module in which the unit cells are connected in series. For this reason, the battery pack according to the second embodiment has excellent controllability of a battery module and is able to improve the cycle performance.

As the unit cell, the flat type nonaqueous electrolyte battery shown in FIG. 1, 3 or 6 may be used.

Figure 7:
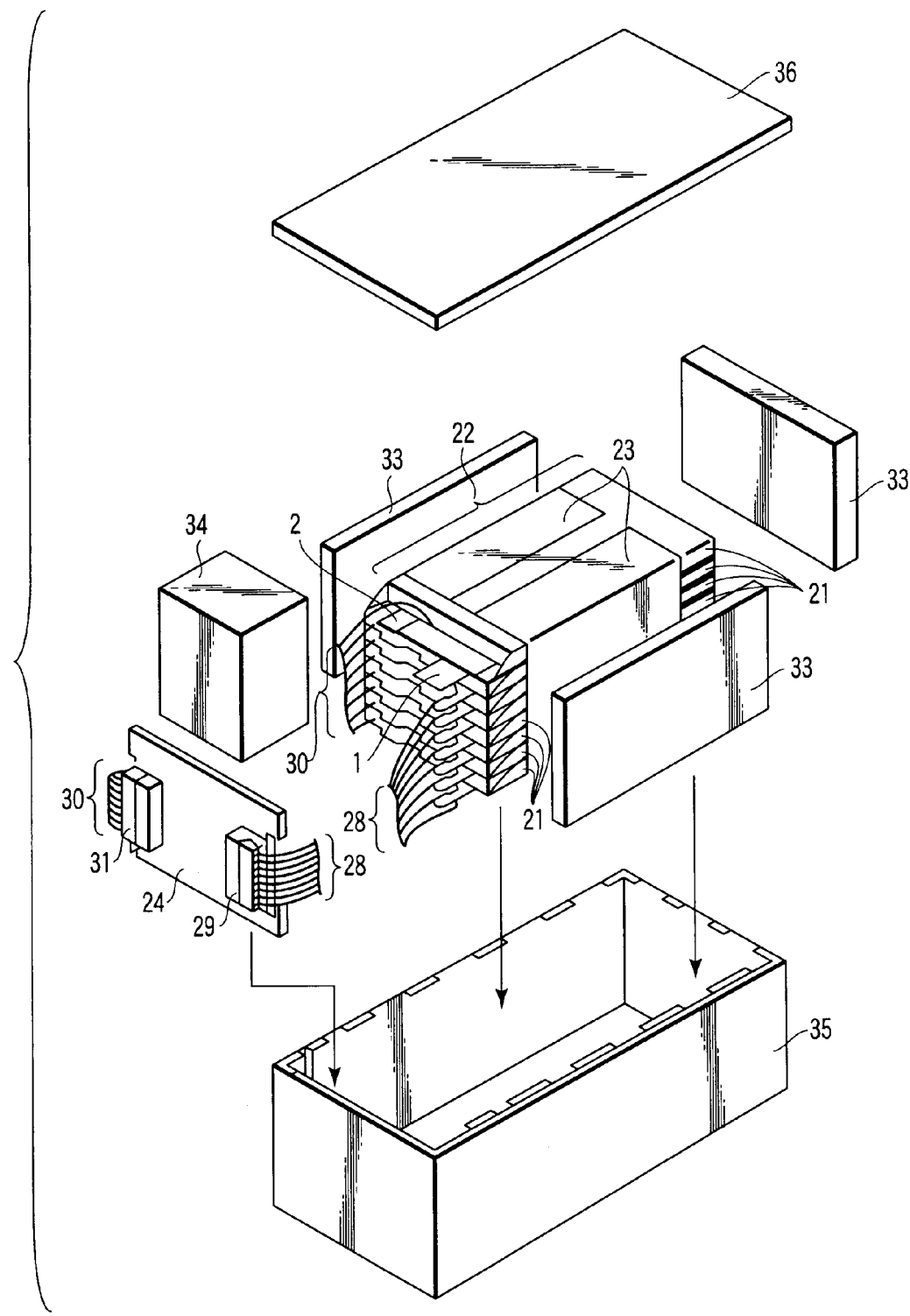
FIG. 7 shows a disassembled perspective view of a battery pack according to a second embodiment.

Each of a plurality of unit cells 21 included in the battery pack shown in FIG. 7 is formed of, though not limited to, a flattened type nonaqueous electrolyte battery constructed as shown in FIG. 1. The plural unit cells 21 are stacked one upon the other in the thickness direction in a manner to align the protruding directions of the positive electrode terminals 1 and the negative electrode terminals 2. As shown in FIG. 7, the unit cells 21 are connected in series to form a battery module 22. The unit cells 21 forming the battery module 22 are made integral by using an adhesive tape 23 as shown in FIG. 7.

A printed wiring board 24 is arranged on the side surface of the battery module 22 toward which protrude the positive electrode terminals 1 and the negative electrode terminals 2.

Figure 8:
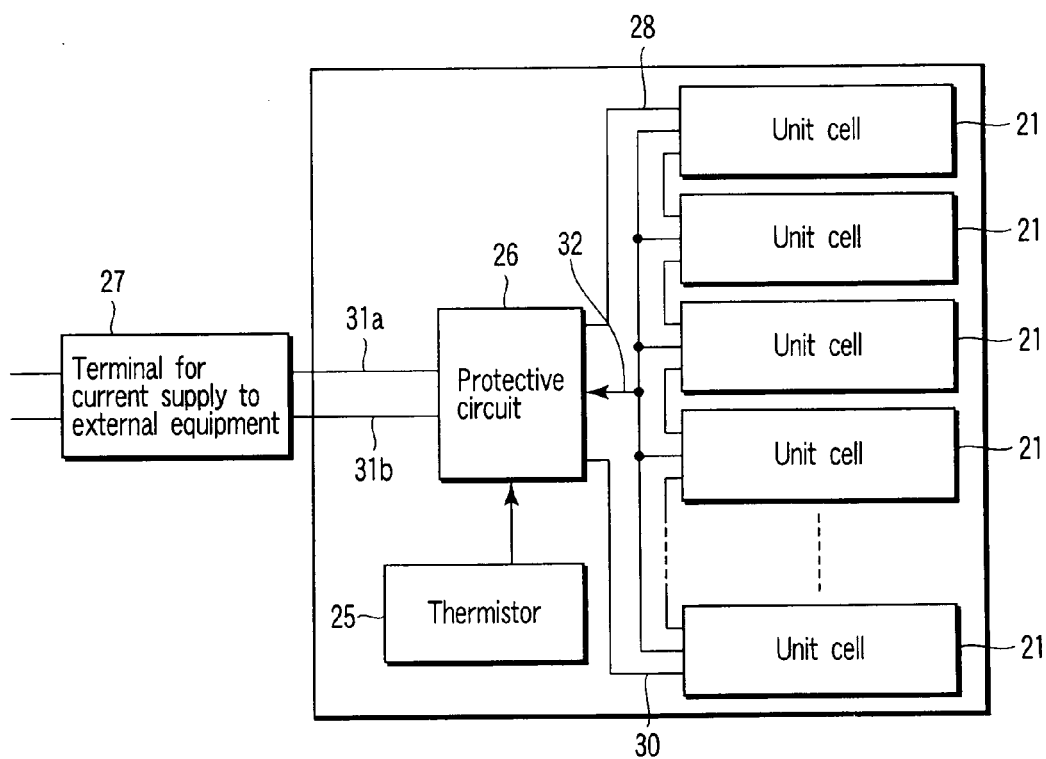
FIG. 8 is a block diagram showing an electric circuit of the battery pack in FIG. 7.

As shown in FIG. 8, a thermistor 25, a protective circuit 26 and a terminal 27 for current supply to the external equipment are connected to the printed wiring board 24.

As shown in FIGS. 7 and 8, a wiring 28 on the side of the positive electrodes of the battery module 22 is electrically connected to a connector 29 on the side of the positive electrode of the protective circuit 26 mounted to the printed wiring board 24. On the other hand, a wiring 30 on the side of the negative electrodes of the battery module 22 is electrically connected to a connector 31 on the side of the negative electrode of the protective circuit 26 mounted to the printed wiring board 24.

The thermistor 25 detects the temperature of the unit cell 21 and transmits the detection signal to the protective circuit 26. The protective circuit 26 is capable of breaking a wiring 31a on the positive side and a wiring 31b on the negative side, the wirings 31a and 31b being stretched between the protective circuit 26 and the terminal 27 for current supply to the external equipment. These wirings 31a and 31b are broken by the protective circuit 26 under prescribed conditions including, for example, the conditions that the temperature detected by the thermistor is higher than a prescribed temperature, and that the over-charging, over-discharging and over-current of the unit cell 21 have been detected. The detecting method is applied to the unit cells 21 or to the battery module 22. In the case of applying the detecting method to each of the unit cells 21, it is possible to detect the battery voltage, the positive electrode potential or the negative electrode potential. On the other hand, where the positive electrode potential or the negative electrode potential is detected, lithium metal electrodes used as reference electrodes are inserted into the unit cells 21.

In the case of FIG. 8, a wiring 32 is connected to each of the unit cells 21 for detecting the voltage, and the detection signal is transmitted through these wirings 32 to the protective circuit 26.

Protective sheets 33 each formed of rubber or resin are arranged on the three of the four sides of the battery module 22, though the protective sheet 33 is not arranged on the side toward which protrude the positive electrode terminals 1 and the negative electrode terminals 2. A protective block 34 formed of rubber or resin is arranged in the clearance between the side surface of the battery module 22 and the printed wiring board 24.

The battery module 22 is housed in a container 35 together with each of the protective sheets 33, the protective block 34 and the printed wiring board 24. To be more specific, the protective sheets 33 are arranged inside the two long sides of the container 35 and inside one short side of the container 35. On the other hand, the printed wiring board 24 is arranged along that short side of the container 35 which is opposite to the short side along which one of the protective sheets 33 is arranged. The battery module 22 is positioned within the space surrounded by the three protective sheets 33 and the printed wiring board 24. Further, a lid 36 is mounted to close the upper open edge of the container 35.

Incidentally, it is possible to use a thermally shrinkable tube in place of the adhesive tape 23 for fixing the battery module 22. In this case, the protective sheets 33 are arranged on both sides of the battery module 22 and, after the thermally shrinkable tube is wound about the protective sheets, the tube is thermally shrunk to fix the battery module 22.

The unit cells 21 shown in FIGS. 7 and 8 are connected in series. However, it is also possible to connect the unit cells 21 in parallel to increase the cell capacity. Of course, it is possible to connect the battery packs in series and in parallel.

Also, the embodiments of the battery pack can be changed appropriately depending on the use of the battery pack.

The battery pack of the second embodiment is preferably applied to uses where cycle performance under a large current is desired. Specific examples of the application of the battery pack include uses as power sources of digital cameras, and uses for vehicles such as two- to four-wheel hybrid electric cars, two- to four-wheel electric cars and power-assisted bicycles. The uses for vehicles are particularly preferable.

In the case where the nonaqueous electrolyte contains a mixture solvent obtained by mixing γ-butyrolactone (GBL) and at least one of diethyl carbonate (DEC) and propylene carbonate (PC), uses for which high-temperature performance is desired are preferable. Specific examples of these uses include the aforementioned uses for vehicles.

Third Embodiment

A vehicle according to a third embodiment is provided with the battery pack according to the second embodiment. A large current of 10 C or more flows in the vehicle-mounted battery pack. Since the unit cell according to the first embodiment is excellent in large current performance, the difference in temperatures and the difference in impedance among the unit cells can be reduced when a large current is charged and discharged in this battery pack. Consequently, since overcharge or over-discharge of a part of the unit cells can be avoided, the battery pack according to the second embodiment is excellent in cycle performance. Accordingly, the vehicle according to the third embodiment is excellent in persistence of characteristics of the driving source. Examples of the vehicle as used herein include two to four wheel hybrid electric cars, two to four wheel electric cars and motor-assist bicycles.

Figure 9:
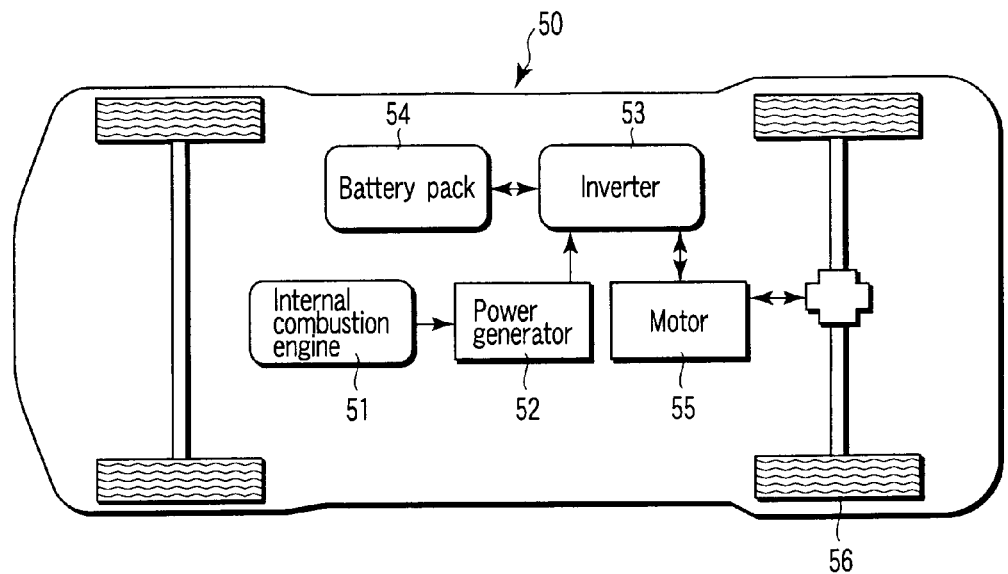
FIG. 9 schematically illustrates a series hybrid vehicle according to a third embodiment.
Figure 10:
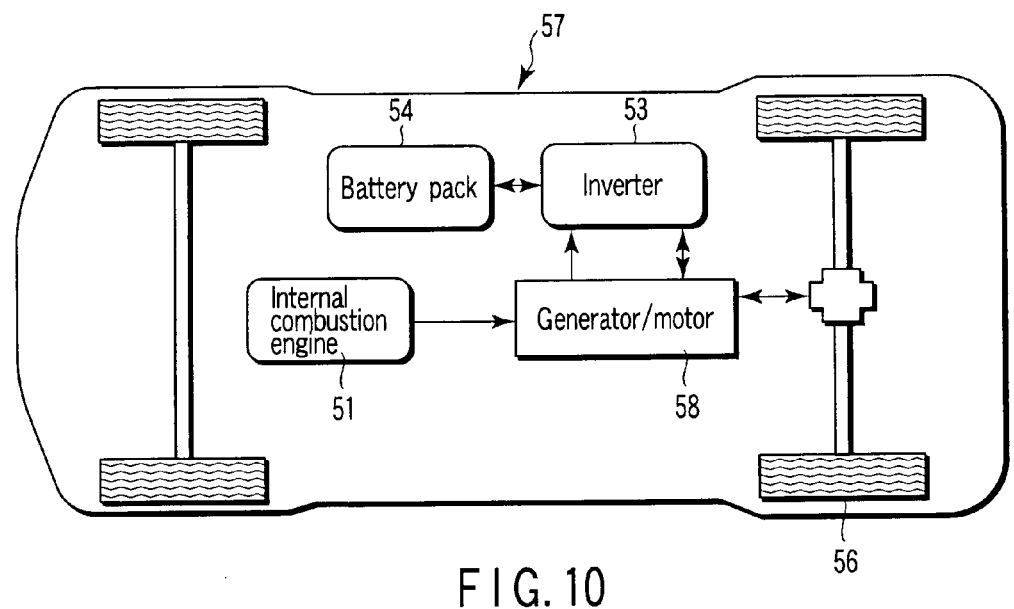
FIG. 10 schematically illustrates a parallel hybrid vehicle according to the third embodiment.

FIGS. 9 to 11 show various type of hybrid vehicles in which an internal combustion engine and a motor driven by a battery pack are used in combination as the power source for the driving. For driving the vehicle, required is the power source exhibiting a wide range of the rotation speed and the torque depending on the running conditions of the vehicle. Since the torque and the rotation speed exhibiting an ideal energy efficiency are limited in the internal combustion engine, the energy efficiency is lowered under the driving conditions other than the limited torque and the rotation speed. Since the hybrid vehicle includes the internal combustion engine and the electric motor, it is possible to improve the energy efficiency of the vehicle. Specifically, the internal combustion engine is operated under the optimum conditions so as to generate an electric power, and the wheels are driven by a high-efficiency electric motor, or the internal combustion engine and the electric motor are operated simultaneously, thereby improving the energy efficiency of the vehicle. Also, by recovering the kinetic energy of the vehicle in the decelerating stage as the electric power, the running distance per unit amount of the fuel can be drastically increased, compared with the vehicle that is driven by the internal combustion engine alone.

The hybrid vehicle can be roughly classified into three types depending on the combination of the internal combustion engine and the electric motor.

FIG. 9 shows a hybrid vehicle 50 that is generally called a series hybrid vehicle. The motive power of an internal combustion engine 51 is once converted entirely into an electric power by a power generator 52, and the electric power thus converted is stored in a battery pack 54 via an inverter 53. The battery pack according to the second embodiment is used as the battery pack 54. The electric power stored in the battery pack 54 is supplied to an electric motor 55 via the inverter 53, with the result that wheels 56 are driven by the electric motor 55. In other words, the hybrid vehicle 50 shown in FIG. 9 represents a system in which a power generator is incorporated into an electric vehicle. The internal combustion engine can be operated under highly efficient conditions and the kinetic energy of the internal combustion engine can be recovered as the electric power. On the other hand, the wheels are driven by the electric motor alone and, thus, the hybrid vehicle 50 requires an electric motor of a high output. It is also necessary to use a battery pack having a relatively large capacity. It is desirable for the rated capacity of the battery pack to fall within a range of 5 to 50 Ah, more desirably 10 to 20 Ah. Incidentally, the rated capacity noted above is the capacity at the time when the battery pack is discharged at a rate of 0.2 C.

FIG. 10 shows the construction of a hybrid vehicle 57 that is called a parallel hybrid vehicle. A reference numeral 58 shown in FIG. 10 denotes an electric motor that also acts as a power generator. The internal combustion engine 51 drives mainly the wheels 56. The motive power of the internal combustion engine 51 is converted in some cases into an electric power by the power generator 58, and the battery pack 54 is charged by the electric power produced from the power generator 58. In the starting stage or the accelerating stage at which the load is increased, the driving force is supplemented by the electric motor 58. The hybrid vehicle 57 shown in FIG. 10 represents a system based on the ordinary vehicle. In this system, the fluctuation in the load of the internal combustion engine 51 is suppressed so as to improve the efficiency, and the regenerative power is also obtained. Since the wheels 56 are driven mainly by the internal combustion engine 51, the output of the electric motor 58 can be determined arbitrarily depending on the required ratio of the assistance. The system can be constructed even in the case of using a relatively small electric motor 58 and a relatively small battery pack 54. The rated capacity of the battery pack can be set to fall within a range of 1 to 20 Ah, more desirably 3 to 10 Ah.

FIG. 11 shows the construction of a hybrid vehicle 59 that is called a series-parallel hybrid vehicle, which utilizes in combination both the series type system and the parallel type system. A power dividing mechanism 60 included in the hybrid vehicle 59 divides the output of the internal combustion engine 51 into the energy for the power generation and the energy for the wheel driving. The series-parallel hybrid vehicle 59 permits controlling the load of the engine more finely than the parallel hybrid vehicle so as to improve the energy efficiency.

It is desirable for the rated capacity of the battery pack to fall within a range of 1 to 20 Ah, more desirably 3 to 10 Ah.

It is desirable for the nominal voltage of the battery pack included in the hybrid vehicles as shown in FIGS. 9 to 11 to fall within a range of 200 to 600V.

It is desirable for the battery pack 54 to be arranged in general in the site where the battery pack 54 is unlikely to be affected by the change in the temperature of the outer atmosphere and unlikely to receive an impact in the event of a collision. In, for example, a sedan type automobile shown in FIG. 12, the battery pack 54 can be arranged within a trunk room rearward of a rear seat 61. The battery pack 54 can also be arranged below or behind the rear seat 61. Where the battery has a large weight, it is desirable to arrange the battery pack 54 below the seat or below the floor in order to lower the center of gravity of the automobile.

An electric vehicle (EV) is driven by the energy stored in the battery pack that is charged by the electric power supplied from outside the vehicle. Therefore, it is possible for the electric vehicle to utilize the electric energy generated at a high efficiency by, for example, another power generating equipment. Also, since the kinetic energy of the vehicle can be recovered as the electric power in the decelerating stage of the vehicle, it is possible to improve the energy efficiency during the driving of the vehicle. It should also be noted that the electric vehicle does not discharge at all the waste gases such as a carbon dioxide gas and, thus, the air pollution problem need not be worried about at all. On the other hand, since all the power required for the driving of the vehicle is produced by an electric motor, it is necessary to use an electric motor of a high output. In general, it is necessary to store all the energy required for one driving in the battery pack by one charging. It follows that it is necessary to use a battery pack having a very large capacity. It is desirable for the rated capacity of the battery pack to fall within a range of 100 to 500 Ah, more desirably 200 to 400 Ah.

The weight of the battery pack occupies a large ratio of the weight of the vehicle. Therefore, it is desirable for the battery pack to be arranged in a low position that is not markedly apart from the center of gravity of the vehicle. For example, it is desirable for the battery pack to be arranged below the floor of the vehicle. In order to allow the battery pack to be charged in a short time with a large amount of the electric power required for the one driving, it is necessary to use a charger of a large capacity and a charging cable. Therefore, it is desirable for the electric vehicle to be equipped with a charging connector connecting the charger and the charging cable. A connector utilizing the electric contact can be used as the charging connector. It is also possible to use a non-contact type charging connector utilizing the inductive coupling.

Figure 13:
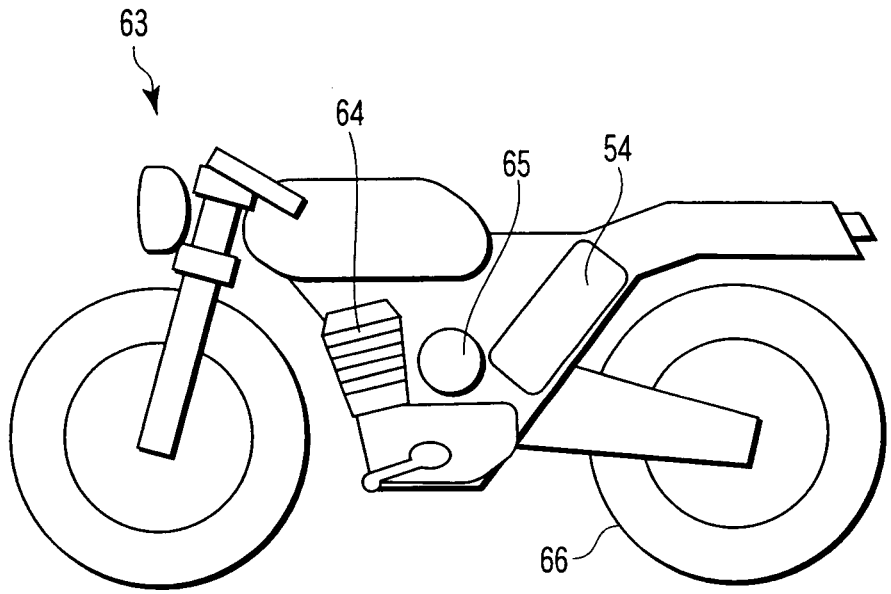
FIG. 13 schematically illustrates a hybrid motor bicycle according to the third embodiment.

FIG. 13 exemplifies the construction of a hybrid motor bicycle 63. It is possible to construct a hybrid motor bicycle 63 exhibiting a high energy efficiency and equipped with an internal combustion engine 64, an electric motor 65, and the battery pack 54 like the hybrid vehicle. The internal combustion engine 64 drives mainly the wheels 66. In some cases, the battery pack 54 is charged by utilizing a part of the motive power generated from the internal combustion engine 64. In the starting stage or the accelerating stage in which the load of the motor bicycle is increased, the driving force of the motor bicycle is supplemented by the electric motor 65. Since the wheels 66 are driven mainly by the internal combustion engine 64, the output of the electric motor 65 can be determined arbitrarily based on the required ratio of the supplement. The electric motor 65 and the battery pack 54, which are relatively small, can be used for constructing the system. It is desirable for the rated capacity of the battery pack to fall within a range of 1 to 20 Ah, more desirably 3 to 10 Ah.

Figure 14:
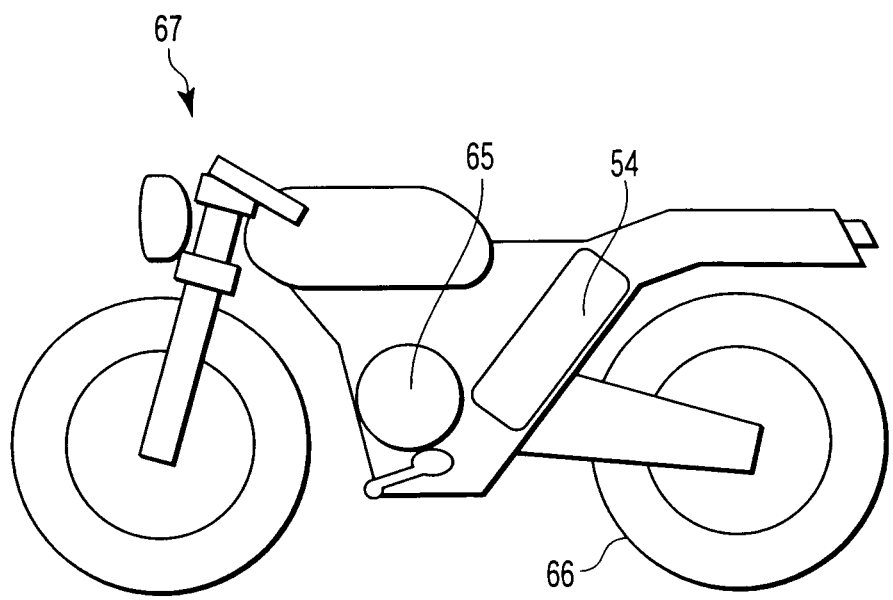
FIG. 14 schematically illustrates an electric motor bicycle according to the third embodiment.

FIG. 14 exemplifies the construction of an electric motor bicycle 67. The electric motor bicycle 67 is driven by the energy stored in the battery pack 54 that is charged by the supply of the electric power from the outside. Since all the driving force required for the driving the motor bicycle 67 is generated from the electric motor 65, it is necessary to use the electric motor 65 of a high output. Also, since it is necessary for the battery pack to store all the energy required for one driving by one charging, it is necessary to use a battery pack having a relatively large capacity. It is desirable for the rated capacity of the battery pack to fall within a range of 10 to 50 Ah, more desirably 15 to 30 Ah.

Fourth Embodiment

Figure 15:
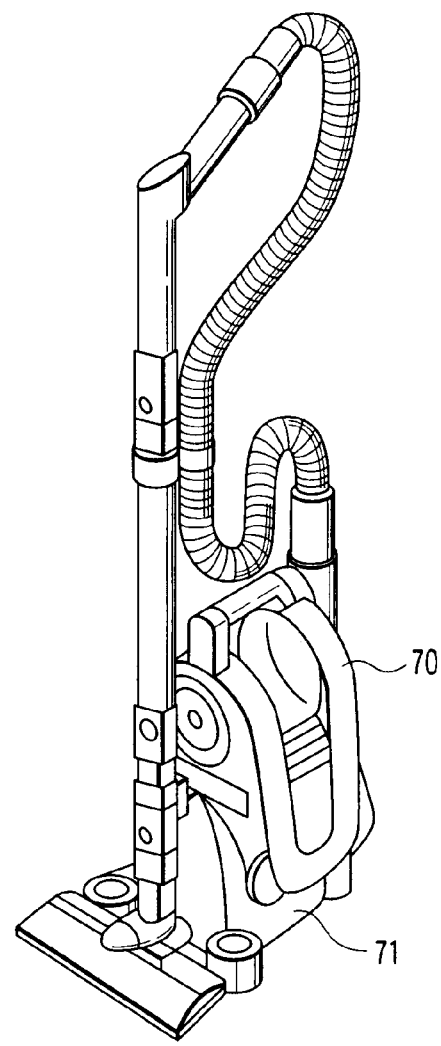
FIG. 15 schematically illustrates a rechargeable vacuum cleaner according to a fourth embodiment.
Figure 16:
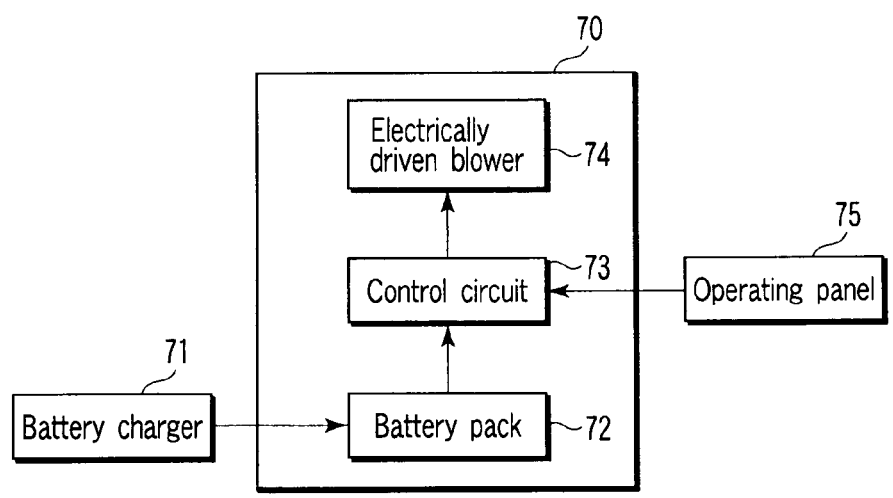
FIG. 16 shows a configuration of the rechargeable vacuum cleaner in FIG. 15.

FIGS. 15 and 16 show an example of a rechargeable vacuum cleaner according to a fourth embodiment. The rechargeable vacuum cleaner comprises an operating panel 75 which selects operation modes, an electrically driven blower 74 comprising a fun motor for generating suction power for dust collection, and a control circuit 73. A battery pack 72 according to the second embodiment as a power source for driving these units are housed in a casing 70. When the battery pack is housed in such a portable device, the battery pack is desirably fixed with interposition of a buffer material in order to prevent the battery pack from being affected by vibration. Known technologies may be applied for maintaining the battery pack at an appropriate temperature. While a battery charger 71 that also serves as a setting table functions as the battery charger of the battery pack according to the second embodiment, a part or all of the function of the battery charger may be housed in the casing 70.

While the rechargeable vacuum cleaner consumes a large electric power, the rated capacity of the battery pack is desirably in the range of 2 to 10 Ah, more preferably 2 to 4 Ah, in terms of portability and operation time. The nominal voltage of the battery pack is desirably in the range of 40 to 80V.

A large current of about 3 C to 5 C flows through the battery pack for a rechargeable vacuum cleaner. The battery pack may assume from a fully charged state to a completely discharged state. The unit cell according to the first embodiment is excellent in large current performance. Accordingly, the difference in temperatures and the difference in impedance among the unit cells can be reduced when a large current is charged and discharged in this battery pack. Consequently, since overcharge or over-discharge of a part of the unit cells can be avoided, the battery pack of the second embodiment is excellent in cycle performance. Therefore, the rechargeable vacuum cleaner according to the fourth embodiment is durable to repeated charging and discharging.

While examples of the invention will be described below, the invention is by no means restricted to the examples as set forth below.

Example 1

<Production of Positive Electrode>

A slurry was prepared by adding 90% by weight of a powder of lithium cobalt oxide ($LiCoO_2$) as a positive electrode active material, 3% by weight of acetylene black and 3% by weight of graphite as conductive agents and 4% by weight of polyvinylidene fluoride (PVdF) to N-methyl-pyrrolidone (NMP) with stirring. After coating the slurry on both surfaces of a current collector made of an aluminum foil with a thickness of 15 μm, the current collector was dried and press-molded to produce a positive electrode with an electrode density of 3.3 $g/cm^3$.

<Production of Negative Electrode>

A lithium titanate ($Li_4TiSO_{12}$) powder with an average particle diameter of 0.82 μm, a BET specific surface area of 10.4 $m^2/g$ and lithium ion absorption potential of 1.55V (vs. $Li/Li^+$) having a spinel structure was prepared as a negative electrode active material.

The particle diameter of the negative electrode active material was measured by the following method.

Specifically, about 0.1 g of a sample, a surfactant, and 1 to 2 mL of a distilled water were put in a beaker, and the distilled water was sufficiently stirred, followed by pouring the stirred system in a stirring water vessel. Under this condition, the light intensity distribution was measured every 2 seconds and measured 64 times in total by using SALD-300, which is a Laser Diffraction Particle Size Analyzer manufactured by Shimadzu Corporation, to analyze the particle diameter distribution data.

Also, the lithium ion absorption potential was measured by the method explained below.

The negative electrode was cut into small pieces each sized at 2 cm×2 cm to obtain working electrodes. The working electrode was arranged to face a counter electrode formed of a lithium metal foil sized at 2.2 cm×2.2 cm with a glass filter separator interposed therebetween, and a lithium metal used as a reference electrode was inserted so as not to be brought into contact with any of the working electrode and the counter electrode. These electrodes were put in a glass cell of a three pole type such that each of the working electrode, the counter electrode and the reference electrode was connected to the terminal of the glass cell. Under the particular condition, 25 mL of an electrolytic solution, which was prepared by dissolving $LiBF_4$ in a concentration of 1.5 mol/L in a mixed solvent prepared by mixing ethylene carbonate (EC) and γ-butyrolactone (GBL) in a mixing ratio by volume of 1:2, was poured into the glass cell such that the separator and the electrodes were sufficiently impregnated with the electrolytic solution, followed by hermetically closing the glass cell. The glass cell thus manufactured was arranged in a constant temperature bath maintained at 25° C. to measure the lithium ion absorption potential of the working electrode at the time when the glass cell was charged with a current density of 0.1 $mA/cm^2$.

N-methylpyrrolidone (NMP) was added to 90% by weight of the negative electrode active material, 5% by weight of coke ($d_{002}$=0.3465 nm, average particle diameter=8.2 μm, BET specific surface area=11.2 $m^2/g$) baked at 1300° C. as a conductive material and 5% by weight of polyvinylidene fluoride (PVdF) so that the proportion of the solid materials became 62%. The mixture was kneaded with a planetary mixer, and the proportion of the solid materials was gradually decreased by adding NMP to prepare a slurry with a viscosity of 10.2 cp as measured with a Brookfield type viscometer at 50 rpm. The slurry was further mixed with a beads mill by using zirconia balls having a diameter of 1 mm as media.

The slurry obtained was coated on both surfaces of a current collector made of an aluminum foil with a thickness of 15 μm, a purity of 99.99% and an average crystal grain size of 10 μm. After drying the slurry, the coated foil was press-rolled with a roll heated at 100° C. to obtain a negative electrode with an electrode density of 2.4 $g/cm^3$ and a porosity of 32%. The pore diameter distribution of the negative electrode obtained was measured by mercury porosimetry as follows.

The distribution of pore diameter of the negative electrode was measured by mercury porosity. As the measuring device, a Shimadzu Autopore 9520 model was used. The negative electrode was cut into a size of about 25×25 $mm^2$, then folded to make a sample which was placed in a measuring cell and then measured in the condition of an initial pressure of 20 kPa which is correspond to about 3 psia and is a pressure corresponding to the pore diameter of about 60 μm. When the data was analyzed, the pore specific surface area was calculated on the premise that the shape of the pore is a cylindrical form.

The pore diameter that gives the highest frequency in the pore diameter distribution was defined as a mode diameter of the negative electrode. The mode diameter of the negative electrode was 0.096 μm. The pore diameter that gives the highest frequency of the pore diameter in the range of 0.01 to 0.2 μm was defined as a first peak mode diameter. The first peak mode diameter was 0.096 μm. The pore diameter that gives the highest frequency of the pore diameter in the range of 0.003 to 0.02 μm was defined as a second peak mode diameter. The second peak mode diameter was 0.0098 μm.

It should be noted that the analytical principle of the mercury porosimetry is based on Washburn's equation (B):

$$D = -4\gamma \cos \theta / P \quad \text{Equation (B)}$$

Here, P is a pressure to be applied, D is a pore diameter, γ is the surface tension of mercury and is 480 dyne·cm$^{-1}$, and θ is a contact angle of mercury with the wall surface of pores and is 140°. γ and θ are constants and therefore, the relation between the applied pressure P and the pore diameter D is found from Washburn's equation. If mercury penetration volume at this time is measured, the pore diameter and its volumetric distribution can be found. As to the details of measuring method, principle and the like, please refer to, for example, Motoji Zimpo et al., "Microparticle Handbook" Asakura Shoten, (1991) and Sohachiro Hayakawa, "Powder Property Measuring Method", Asakura Shoten (1978).

The pore volume per 1 g of the weight of the negative electrode excluding the weight of the negative electrode current collector was 0.2586 (mL/g) in the total range of the pore diameter distribution, 0.1393 (mL/g) in the range of the pore diameter of 0.01 to 0.02 μm, and 0.0005 (mL/g) in the range of the pore diameter of 0.003 to 0.02 μm. The surface area of the pore per 1 g of the weight of the negative electrode excluding the weight of the negative electrode current collector was 7.77 (m$^2$/g) in the total range of the pore diameter distribution, 7.58 (m$^2$/g) in the range of 0.01 to 0.2 μm, and 0.19 (m$^2$/g) in the range of 0.003 to 0.02 μm.

<Production of Electrode Group>

A positive electrode, a separator of a porous film made of polyethylene with a thickness of 25 μm, a negative electrode and a separator were laminated in this order, and the laminate was spirally coiled. The resultant coil was hot-pressed at 80° C. to obtain a flat electrode group with a width of 30 mm and a thickness of 1.6 mm. The electrode group obtained was housed in a pack made of a laminate film with a thickness of 0.1 mm and having a three-layer structure of a nylon layer/an aluminum layer/a polyethylene layer, and the electrode group was vacuum-dried at 80° C. for 24 hours.

<Preparation of Liquid Nonaqueous Electrolyte>

LiBF$_4$ as an electrolyte was dissolved at a concentration of 2.0 mol/L in a mixed solvent prepared by mixing ethylene carbonate (EC), propylene carbonate (PC) and γ-butyrolactone (GBL) in a volume ratio of 1:1:4. A nonaqueous electrolyte was prepared by adding 0.5 wt % of 1,3-propene sultone and 0.1 wt % of tris(trimethylsilyl)phosphate to the obtained solution. The viscosity of the nonaqueous electrolyte measured with a Brookfield type viscometer was 7.1 cp at 20° C.

After injecting the liquid nonaqueous electrolyte into the laminate film pack that has housed the electrode group, the pack is hermetically sealed by heat sealing to produce a nonaqueous electrolyte secondary battery having the structure shown in FIG. 1 with a width of 35 mm, a thickness of 2.0 mm and a height of 65 mm.

Examples 2 to 12 and Comparative Examples 1 to 9

The nonaqueous electrolyte secondary batteries were prepared by the same method as in Example 1, except that the kinds and amounts of addition of the first and second additives were changed as shown in Table 2.

Example 13

The nonaqueous electrolyte secondary battery was prepared by the same method as in Example 2, except that the solvent used for the nonaqueous electrolyte was changed to a mixed solvent containing ethylene carbonate (EC), γ-butyrolactone (GBL) and diethyl carbonate (GEC) in a volume ratio of 1:1:4.

Example 14

The nonaqueous electrolyte secondary battery was prepared by the same method as in Example 2, except that the solvent used for the nonaqueous electrolyte was changed to a mixed solvent containing ethylene carbonate (EC) and diethyl carbonate in a volume ratio of 1:2.

Example 15

The nonaqueous electrolyte secondary battery was prepared by the same method as in Example 2, except that LiCoO$_2$ particles a part of the surface of which is coated with 2 wt % of ZrO$_2$ layer were used as the positive electrode active material.

Example 16

The nonaqueous electrolyte secondary battery was prepared by the same method as in Example 2, except that LiCoO$_2$ particles a part of the surface of which is coated with 2 wt % of MgO layer were used as the positive electrode active material.

Example 17

The nonaqueous electrolyte secondary battery was prepared by the same method as in Example 2, except that LiCoO$_2$ particles a part of the surface of which is coated with 2 wt % of B$_2$O$_3$ layer were used as the positive electrode active material.

Example 18

The nonaqueous electrolyte secondary battery was prepared by the same method as in Example 2, except that LiCoO$_2$ particles a part of the surface of which is coated with 2 wt % of Al$_2$O$_3$ layer were used as the positive electrode active material.

Example 19

The nonaqueous electrolyte secondary battery was prepared by the same method as in Example 2, except that TiO$_2$ with an average particle diameter of 0.7 μm was used as the negative electrode active material. The mode diameter of the negative electrode was 0.090 μm from the pore diameter distribution of the negative electrode. The pore diameter that gives the highest frequency in the range of the pore diameter of 0.01 to 0.2 μm was defined as the first peak mode diameter. The first peak mode diameter was 0.090 μm. The pore diameter that gives the highest frequency in the range of the pore diameter of 0.003 to 0.02 μm was defined as the second peak mode diameter. The second peak mode diameter was 0.0096 μm. The pore volume per 1 g of the weight of the negative electrode excluding the weight of the negative electrode current collector was 0.3086 (mL/g) in the total range of the pore diameter distribution, 0.1699 (mL/g) in the range of 0.01 to 0.2 μm, and 0.0006 (mL/g) in the range of 0.003 to 0.02 μm. The surface area of the pore per 1 g of the weight of the negative electrode excluding the weight of the negative electrode current collector was 9.67 ($m^2$/g) in the total range of the pore diameter distribution, 9.39 ($m^2$/g) in the range of 0.01 to 0.2 μm, and 0.28 ($m^2$/g) in the range of 0.003 to 0.02 μm.

Comparative Example 10

The nonaqueous electrolyte secondary battery was prepared by the same method as in Example 3, except that $TiO_2$ was used as the negative electrode active material.

The batteries in Examples 1 to 19 and Comparative Examples 1 to 10 were discharged at low-rate discharge of 1 C and high-rate discharge of 20 C, and the ratios of the capacity at the low-rate discharge of 1 C to the capacity at the high-rate discharge of 20 C were summarized in Table 2. A cycle test for repeating charge-discharge of 10 C charge/10 C discharge was preformed at 35° C., and the number of cycles when the capacity was 80% of the initial discharge capacity of 10 C was defined as a cycle life, which was also described in Table 2.

TABLE 1

| | Negative electrode active material | Positive electrode active material | Solvent | Solute |
|---|---|---|---|---|
| Comparative example 1 | $Li_4Ti_5O_{12}$ | $LiCoO_2$ | EC/PC/GBL (1:1:4) | 2.0M $LiBF_4$ |
| Comparative example 2 | $Li_4Ti_5O_{12}$ | $LiCoO_2$ | EC/PC/GBL (1:1:4) | 2.0M $LiBF_4$ |
| Comparative example 3 | $Li_4Ti_5O_{12}$ | $LiCoO_2$ | EC/PC/GBL (1:1:4) | 2.0M $LiBF_4$ |
| Comparative example 4 | $Li_4Ti_5O_{12}$ | $LiCoO_2$ | EC/PC/GBL (1:1:4) | 2.0M $LiBF_4$ |
| Comparative example 5 | $Li_4Ti_5O_{12}$ | $LiCoO_2$ | EC/PC/GBL (1:1:4) | 2.0M $LiBF_4$ |
| Comparative example 6 | $Li_4Ti_5O_{12}$ | $LiCoO_2$ | EC/PC/GBL (1:1:4) | 2.0M $LiBF_4$ |
| Comparative example 7 | $Li_4Ti_5O_{12}$ | $LiCoO_2$ | EC/PC/GBL (1:1:4) | 2.0M $LiBF_4$ |
| Comparative example 8 | $Li_4Ti_5O_{12}$ | $LiCoO_2$ | EC/PC/GBL (1:1:4) | 2.0M $LiBF_4$ |
| Comparative example 9 | $Li_4Ti_5O_{12}$ | $LiCoO_2$ | EC/PC/GBL (1:1:4) | 2.0M $LiBF_4$ |
| Example 1 | $Li_4Ti_5O_{12}$ | $LiCoO_2$ | EC/PC/GBL (1:1:4) | 2.0M $LiBF_4$ |
| Example 2 | $Li_4Ti_5O_{12}$ | $LiCoO_2$ | EC/PC/GBL (1:1:4) | 2.0M $LiBF_4$ |
| Example 3 | $Li_4Ti_5O_{12}$ | $LiCoO_2$ | EC/PC/GBL (1:1:4) | 2.0M $LiBF_4$ |
| Example 4 | $Li_4Ti_5O_{12}$ | $LiCoO_2$ | EC/PC/GBL (1:1:4) | 2.0M $LiBF_4$ |
| Example 5 | $Li_4Ti_5O_{12}$ | $LiCoO_2$ | EC/PC/GBL (1:1:4) | 2.0M $LiBF_4$ |
| Example 6 | $Li_4Ti_5O_{12}$ | $LiCoO_2$ | EC/PC/GBL (1:1:4) | 2.0M $LiBF_4$ |
| Example 7 | $Li_4Ti_5O_{12}$ | $LiCoO_2$ | EC/PC/GBL (1:1:4) | 2.0M $LiBF_4$ |
| Example 8 | $Li_4Ti_5O_{12}$ | $LiCoO_2$ | EC/PC/GBL (1:1:4) | 2.0M $LiBF_4$ |
| Example 9 | $Li_4Ti_5O_{12}$ | $LiCoO_2$ | EC/PC/GBL (1:1:4) | 2.0M $LiBF_4$ |
| Example 10 | $Li_4Ti_5O_{12}$ | $LiCoO_2$ | EC/PC/GBL (1:1:4) | 2.0M $LiBF_4$ |
| Example 11 | $Li_4Ti_5O_{12}$ | $LiCoO_2$ | EC/PC/GBL (1:1:4) | 2.0M $LiBF_4$ |
| Example 12 | $Li_4Ti_5O_{12}$ | $LiCoO_2$ | EC/PC/GBL (1:1:4) | 2.0M $LiBF_4$ |
| Example 13 | $Li_4Ti_5O_{12}$ | $LiCoO_2$ | EC/GBL/DEC (1:1:4) | 2.0M $LiBF_4$ |
| Example 14 | $Li_4Ti_5O_{12}$ | $LiCoO_2$ | EC/DEC (1:2) | 2.0M $LiBF_4$ |
| Example 15 | $Li_4Ti_5O_{12}$ | $LiCoO_2$ ($ZrO_2$) | EC/PC/GBL (1:1:4) | 2.0M $LiBF_4$ |
| Example 16 | $Li_4Ti_5O_{12}$ | $LiCoO_2$ (MgO) | EC/PC/GBL (1:1:4) | 2.0M $LiBF_4$ |
| Example 17 | $Li_4Ti_5O_{12}$ | $LiCoO_2$ ($B_2O_3$) | EC/PC/GBL (1:1:4) | 2.0M $LiBF_4$ |
| Example 18 | $Li_4Ti_5O_{12}$ | $LiCoO_2$ ($Al_2O_3$) | EC/PC/GBL (1:1:4) | 2.0M $LiBF_4$ |
| Comparative example 10 | $TiO_2$ | $LiCoO_2$ | EC/PC/GBL (1:1:4) | 2.0M $LiBF_4$ |
| Example 19 | $TiO_2$ | $LiCoO_2$ | EC/PC/GBL (1:1:4) | 2.0M $LiBF_4$ |

TABLE 2

| | First additive | Amount of addition of first additive (% by weight) | Second additive | Amount of addition of second additive (% by weight) | 20 C capacity/ 1 C capacity ratio (%) | Cycle life (cycles) |
|---|---|---|---|---|---|---|
| Comparative example 1 | 1,3-propene sultone | 0.1 | — | — | 55 | 2400 |
| Comparative example 2 | 1,3-propene sultone | 0.2 | — | — | 53 | 2700 |
| Comparative example 3 | 1,3-propene sultone | 0.5 | — | — | 53 | 2700 |
| Comparative example 4 | 1,3-propene sultone | 1 | — | — | 50 | 2500 |
| Comparative example 5 | 1,4-butene sultone | 0.1 | — | — | 50 | 2000 |
| Comparative example 6 | 1,4-butene sultone | 0.2 | — | — | 50 | 2500 |
| Comparative example 7 | 1,4-butene sultone | 0.5 | — | — | 48 | 2500 |
| Comparative example 8 | 1,4-butene sultone | 1 | — | — | 42 | 2300 |
| Comparative example 9 | — | — | Tris (trimethylsilyl) phosphate | 0.5 | 67 | 2000 |
| Example 1 | 1,3-propene sultone | 0.5 | Tris (trimethylsilyl) phosphate | 0.1 | 80 | 4800 |

TABLE 2-continued

|  | First additive | Amount of addition of first additive (% by weight) | Second additive | Amount of addition of second additive (% by weight) | 20 C capacity/ 1 C capacity ratio (%) | Cycle life (cycles) |
|---|---|---|---|---|---|---|
| Example 2 | 1,3-propene sultone | 0.5 | Tris (trimethylsilyl) phosphate | 0.25 | 76 | 5000 |
| Example 3 | 1,3-propene sultone | 0.5 | Tris (trimethylsilyl) phosphate | 0.5 | 73 | 5000 |
| Example 4 | 1,3-propene sultone | 0.5 | Bis (trimethylsilyl) methyl phosphate | 0.1 | 75 | 4000 |
| Example 5 | 1,3-propene sultone | 0.5 | Bis (trimethylsilyl) methyl phosphate | 0.25 | 73 | 4200 |
| Example 6 | 1,3-propene sultone | 0.5 | Bis (trimethylsilyl) methyl phosphate | 0.5 | 70 | 4200 |
| Example 7 | 1,4-butene sultone | 0.5 | Tris (trimethylsilyl) phosphate | 0.1 | 77 | 4500 |
| Example 8 | 1,4-butene sultone | 0.5 | Tris (trimethylsilyl) phosphate | 0.25 | 75 | 4800 |
| Example 9 | 1,4-butene sultone | 0.5 | Tris (trimethylsilyl) Phosphate | 0.5 | 70 | 4800 |
| Example 10 | 1,4-butene sultone | 0.5 | Bis (trimethylsilyl) methyl phosphate | 0.1 | 73 | 3800 |
| Example 11 | 1,4-butene sultone | 0.5 | Bis (trimethylsilyl) methyl phosphate | 0.25 | 71 | 3500 |
| Example 12 | 1,4-butene sultone | 0.5 | Bis (trimethylsilyl) methyl phosphate | 0.5 | 70 | 3500 |
| Example 13 | 1,3-propene sultone | 0.5 | Tris (trimethylsilyl) phosphate | 0.25 | 74 | 4800 |
| Example 14 | 1,3-propene sultone | 0.5 | Tris (trimethylsilyl) phosphate | 0.25 | 63 | 3700 |
| Example 15 | 1,3-propene sultone | 0.5 | Tris (trimethylsilyl) phosphate | 0.25 | 75 | 6700 |
| Example 16 | 1,3-propene sultone | 0.5 | Tris (trimethylsilyl) phosphate | 0.25 | 76 | 7500 |
| Example 17 | 1,3-propene sultone | 0.5 | Tris (trimethylsilyl) phosphate | 0.25 | 76 | 7000 |
| Example 18 | 1,3-propene sultone | 0.5 | Tris (trimethylsilyl) phosphate | 0.25 | 75 | 6000 |
| Comparative example 10 | 1,3-propene sultone | 0.5 | — | — | 45 | 300 |
| Example 19 | 1,3-propene sultone | 0.5 | Tris (trimethylsilyl) phosphate | 0.25 | 67 | 600 |

It was shown that the nonaqueous electrolyte secondary batteries in Examples 1 to 18, in which a sultone having an unsaturated hydrocarbon group and the compound having the functional group represented by the formula (1) were used together in the nonaqueous electrolyte, were excellent in large current performance with long cycle life in a high temperature environment.

On the contrary, both large current performance and charge-discharge cycle performance in Comparative Examples 1 to 8, in which only sultone were used, were inferior to those in Examples 1 to 18. The battery in Comparative Example 9 using only the above-mentioned compound was inferior to the batteries in Examples 1 to 18 with respect to charge-discharge cycle performance.

It was shown from the comparison of Examples 1 to 12 that excellent charge-discharge cycle performance is obtained by using 1,3-propene sultone as the first additive and tris(trimethylsilyl)phosphate as the second additive.

It may be understood from the comparison of Examples 2, 13 and 14 that excellent large current performance and charge-discharge cycle performance are obtained in Examples 2 and 13 using a solvent containing GBL.

It may be understood from the comparison of Examples 2 and 15 to 18 that charge-discharge cycle performance in Examples 15 to 18, in which a part of the surface of the particles of lithium-transition metal composite oxide is coated with an oxide layer of at least one element selected from Al, Mg, Zr, B, Ti and Ga, is remarkably excellent.

The results of Example 19 and Comparative Example 10 show that large current performance and charge-discharge cycle performance are also improved by using the sultone having the unsaturated hydrocarbon group and the compound having the functional group represented by the formula (1) together when $TiO_2$ is used as the titanium-containing oxide.

Example 20

The nonaqueous electrolyte battery was manufactured by the same method as in Example 2, except that a spinel type lithium titanate ($Li_4TiSO_{12}$) powder with an average particle diameter of 5.84 μm, BET specific surface area of 2.1 m²/g and lithium ion absorption potential of 1.55V (vs. Li/Li⁺) was used as the negative electrode active material.

Example 21

The nonaqueous electrolyte battery was manufactured by the same method as in Example 2, except that a spinel type lithium titanate ($Li_4TiSO_{12}$) powder with an average particle diameter of 0.98 μm, BET specific surface area of 6.1 m²/g and lithium ion absorption potential of 1.55V (vs. Li/Li⁺) was used as the negative electrode active material.

Example 22

The nonaqueous electrolyte battery was manufactured by the same method as in Example 2, except that a spinel type lithium titanate ($Li_4Ti_5O_{12}$) powder with an average particle diameter of 0.62 μm, BET specific surface area of 21.6 m²/g and lithium ion absorption potential of 1.55V (vs. $Li/Li^+$) was used as the negative electrode active material.

Example 23

The nonaqueous electrolyte battery was manufactured by the same method as in Example 2, except that a spinel type lithium titanate ($Li_4TiSO_{12}$) powder with an average particle diameter of 0.41 μm, BET specific surface area of 35.2 m²/g and lithium ion absorption potential of 1.55V (vs. $Li/Li^+$) was used as the negative electrode active material.

Example 24

The nonaqueous electrolyte battery was manufactured by the same method as in Example 2, except that a spinel type lithium titanate ($Li_4Ti_5O_{12}$) powder with an average particle diameter of 0.02 μm, BET specific surface area of 70.4 m²/g and lithium ion absorption potential of 1.55V (vs. $Li/Li^+$) was used as the negative electrode active material.

The density of the negative electrodes and pore diameter distribution measured by mercury porosimetry of the batteries obtained in Examples 20 to 24 are shown in Tables 3 and 4.

The batteries in Example 20 to 24 were discharged at low-rate discharge of 1 C and high-rate discharge of 30 C, and the ratios of the capacity at the low-rate discharge of 1 C to the capacity at the high-rate discharge of 30 C were summarized in Table 4. A cycle test for repeating charge-discharge of 10 C charge/10 C discharge was preformed at 35° C., and the number of cycles when the capacity was 80% of the initial discharge capacity of 10 C was defined as a cycle life, which was also described in Table 4.

The batteries in Examples 2 and 21 to 23 have higher maintenance factors at high-rate discharge of 30 C and longer cycle life than the batteries in Examples 20 and 24. Decomposition products of the additive as the coating film were uniformly formed on the macropores of the negative electrode in the batteries in Examples 2 and 21 to 23. Accordingly, it was supposed that good performance was exhibited since negative electrode resistance was reduced. On the other hand, in the battery of Example 20, the mode diameter of the pore diameter distribution exceeded 0.2 μm, and initial resistance of the negative electrode is large while increment of resistance of the negative electrode is large during the charge-discharge cycle. This was conjectured to cause the decrease in the maintenance factor of high-rate discharge and cycle life. The battery in Example 21 has a so small pore diameter that the decomposition component as the coating film was completely filled in the pore. Consequently, it was conjectured that resistance of the negative electrode was increased and maintenance factor of high-rate discharge was decreased. Depletion of the nonaqueous electrolyte at the positive electrode was confirmed in the battery in Example 21 as a result of inspection by disassembling. Depletion of the nonaqueous electrolyte at the positive electrode might be caused by excessively larger surface area of the negative electrode than the surface area of the positive electrode, which was supposed to decrease the cycle life.

Example 25

$LiBF_4$ as an electrolyte was dissolved in a mixed solvent (volume ratio 1:1:4) of ethylene carbonate (EC), propylene carbonate (PC) and γ-butyrolactone (GBL) in a concentration of 2.0 mol/L. A liquid nonaqueous electrolyte was prepared by adding 0.1% by weight of 1,3-propene sultone and 1% by weight of tris(trimethylsilyl)phosphate to the obtained solution. A nonaqueous electrolyte secondary battery having the structure shown by FIG. 3 with a size of 120

TABLE 3

| | Negative electrode active material | Average particle diameter of negative electrode active material (μm) | Specific surface area of negative electrode active material (m²/g) | Density of negative electrode (g/cm³) | Pore volume of negative electrode (mL/g) | Pore surface area of negative electrode (m²/g) | Mode diameter of negative electrode (μm) | Porosity of negative electrode (%) | Number of peaks |
|---|---|---|---|---|---|---|---|---|---|
| Example 20 | $Li_4Ti_5O_{12}$ | 5.84 | 2.1 | 2.2 | 0.0972 | 2.08 | 0.265 | 25.6 | 1 |
| Example 21 | $Li_4Ti_5O_{12}$ | 0.98 | 6.1 | 2.4 | 0.1474 | 6.12 | 0.155 | 32.1 | 2 |
| Example 2 | $Li_4Ti_5O_{12}$ | 0.82 | 10.4 | 2.4 | 0.2586 | 7.77 | 0.096 | 32.0 | 2 |
| Example 22 | $Li_4Ti_5O_{12}$ | 0.62 | 21.6 | 2.3 | 0.3374 | 16.87 | 0.050 | 37.4 | 2 |
| Example 23 | $Li_4Ti_5O_{12}$ | 0.41 | 35.2 | 2.2 | 0.3921 | 26.84 | 0.018 | 39.6 | 2 |
| Example 24 | $Li_4Ti_5O_{12}$ | 0.02 | 70.4 | 1.6 | 1.2211 | 60.12 | 0.009 | 44.0 | 1 |

TABLE 4

| | Pore volume of negative electrode [0.01-0.2 μm] (mL/g) | Pore surface area of negative electrode [0.01-0.2 μm] (m²/g) | Mode diameter of negative electrode [0.01-0.2 μm] (μm) | Pore volume of negative electrode [0.003-0.02 μm] (mL/g) | Pore surface area of negative electrode [0.003-0.02 μm] (m²/g) | Mode diameter of negative electrode [0.003-0.02 μm] (μm) | 30 C capacity/ 1 C capacity ratio (%) | Cycle life (cycles) |
|---|---|---|---|---|---|---|---|---|
| Example 20 | 0.0803 | 2.01 | 0.265 | — | — | — | 15 | 3000 |
| Example 21 | 0.1012 | 6.04 | 0.155 | 0.0001 | 0.10 | 0.0081 | 55 | 4000 |
| Example 2 | 0.1393 | 7.58 | 0.096 | 0.0005 | 0.19 | 0.0098 | 60 | 5000 |
| Example 22 | 0.1650 | 15.93 | 0.051 | 0.0021 | 0.91 | 0.0100 | 62 | 5000 |
| Example 23 | 0.1803 | 25.46 | 0.020 | 0.0084 | 1.22 | 0.0100 | 65 | 5000 |
| Example 24 | — | — | — | — | — | — | 45 | 2000 | mm in width, 70 mm in height and 5 mm in thickness and a capacity of 2 Ah was manufactured by using the same materials in Example 1 except the liquid nonaqueous electrolyte.

Examples 25 to 47, Comparative Examples 11, 12, 13, 16 and 19

A nonaqueous electrolyte secondary battery having the same constitution as in Example 25 was manufactured, except that the first and second additives were added in the amounts shown in Table 5.

Comparative Examples 14, 15, 17, 18, 20 and 21

A nonaqueous electrolyte secondary battery having the same constitution as in Example 25 was manufactured, except that graphite was used for the negative electrode active material, a copper foil with a thickness of 10 μm was used for the negative electrode current collector, and the first and second additives were added in the amounts shown in Table 5.

Example 35

A nonaqueous electrolyte secondary battery having the same constitution as in Example 31 was manufactured, except that 1% by weight of fluorotrimethylsilane was further added to the nonaqueous electrolyte as an additive.

Example 41

A nonaqueous electrolyte secondary battery having the same constitution as in Example 37 was manufactured, except that 1% by weight of fluorotrimethylsilane was further added to the nonaqueous electrolyte as an additive.

Example 47

A nonaqueous electrolyte secondary battery having the same constitution as in Example 43 was manufactured, except that 1% by weight of fluorotrimethylsilane was further added to the nonaqueous electrolyte as an additive.

Examples 48 to 71 and Comparative Examples 22 to 30

Nonaqueous electrolyte batteries as shown in Table 6 having the same constitutions in Examples 25 to 47 and Comparative Examples 11 to 21, respectively, were manufactured, except that lithium manganate ($LiMn_{1.9}Al_{0.1}O_4$) having the spinel structure was used as the positive electrode active material and the density of the positive electrode was adjusted to 3.0 g/cm$^3$.

The nonaqueous electrolyte batteries manufactured in Examples 25 to 71 and Comparative Examples 11 to 30 were subjected to low rate discharge of 1 C and high rate discharge of 30 C, and the ratios of 30 C discharge capacity to 1 C discharge capacity were summarized in Tables 5 and 6 below. The battery resistance at SOC (State of Charge) of 80% was measured. The results were represented by the ratio based on the battery resistance of a standard battery to which no additive is added, and were summarized in Tables 5 and 6. The battery in Comparative Example 11 corresponds to the standard battery in Table 5, while the battery in Comparative Example 22 corresponds to the standard battery in Table 6. These batteries were subjected to continuous voltage application tests to be continuously charged for 16 weeks at a voltage of SOC 80% at a temperature of 45° C. The rate of change of the battery resistance was determined and shown in Tables 5 and 6. The rate of change of the battery resistance was calculated from the ratio of the battery resistance after the test to the battery resistance before the test.

TABLE 5

| | Negative electrode active material | First additive | Amount of addition of first additive (% by weight) | Second additive | Amount of addition of second additive (% by weight) | 30 C capacity/ 1 C capacity ratio (%) | Initial resistance (times) | Rate of increase in resistance (times) |
|---|---|---|---|---|---|---|---|---|
| Comparative Example 11 | $Li_4Ti_5O_{12}$ | — | — | — | — | 85 | 1.00 | 3.00 |
| Comparative Example 12 | $Li_4Ti_5O_{12}$ | 1,3-propene sultone | 0.1 | — | — | 60 | 1.15 | 1.7 |
| Example 25 | $Li_4Ti_5O_{12}$ | 1,3-propene sultone | 0.1 | Tris(trimethylsilyl) phosphate | 1 | 87 | 0.93 | 1.33 |
| Example 26 | $Li_4Ti_5O_{12}$ | 1,3-propene sultone | 0.1 | Tris(trimethylsilyl) phosphate | 2 | 92 | 0.87 | 1.28 |
| Example 27 | $Li_4Ti_5O_{12}$ | 1,3-propene sultone | 0.1 | Tris(trimethylsilyl) phosphate | 3 | 87 | 0.87 | 1.25 |
| Example 28 | $Li_4Ti_5O_{12}$ | 1,3-propene sultone | 0.1 | Tris(trimethylsilyl) phosphate | 5 | 82 | 0.87 | 1.25 |
| Example 29 | $Li_4Ti_5O_{12}$ | 1,3-propene sultone | 0.1 | Tris(trimethylsilyl) phosphate | 10 | 70 | 0.94 | 1.38 |
| Comparative Example 13 | $Li_4Ti_5O_{12}$ | 1,3-propene sultone | 0.5 | — | — | 50 | 1.25 | 1.55 |
| Example 30 | $Li_4Ti_5O_{12}$ | 1,3-propene sultone | 0.5 | Tris(trimethylsilyl) phosphate | 1 | 85 | 0.95 | 1.3 |
| Example 31 | $Li_4Ti_5O_{12}$ | 1,3-propene sultone | 0.5 | Tris(trimethylsilyl) phosphate | 2 | 90 | 0.9 | 1.25 |
| Example 32 | $Li_4Ti_5O_{12}$ | 1,3-propene sultone | 0.5 | Tris(trimethylsilyl) phosphate | 3 | 85 | 0.9 | 1.23 |
| Example 33 | $Li_4Ti_5O_{12}$ | 1,3-propene sultone | 0.5 | Tris(trimethylsilyl) phosphate | 5 | 80 | 0.9 | 1.2 |
| Example 34 | $Li_4Ti_5O_{12}$ | 1,3-propene sultone | 0.5 | Tris(trimethylsilyl) phosphate | 10 | 70 | 0.98 | 1.35 |

TABLE 5-continued

| | Negative electrode active material | First additive | Amount of addition of first additive (% by weight) | Second additive | Amount of addition of second additive (% by weight) | 30 C capacity/ 1 C capacity ratio (%) | Initial resistance (times) | Rate of increase in resistance (times) |
|---|---|---|---|---|---|---|---|---|
| Example 35 | Li$_4$Ti$_5$O$_{12}$ | 1,3-propene sultone | 0.5 | Tris(trimethylsilyl) phosphate | 2 | 85 | 0.90 | 1.22 |
| | | | | fluorotrimethylsilane | 1 | | | |
| Comparative Example 14 | Graphite | 1,3-propene sultone | 0.5 | — | — | 30 | 1.5 | >5 (Swelling by gas) |
| Comparative Example 15 | Graphite | 1,3-propene sultone | 0.5 | Tris(trimethylsilyl) phosphate | 2 | 10 | 2.0 | >5 (Swelling by gas) |
| Comparative Example 16 | Li$_4$Ti$_5$O$_{12}$ | 1,3-propene sultone | 1 | — | — | 40 | 1.35 | 1.45 |
| Example 36 | Li$_4$Ti$_5$O$_{12}$ | 1,3-propene sultone | 1 | Tris(trimethylsilyl) phosphate | 1 | 80 | 1 | 1.3 |
| Example 37 | Li$_4$Ti$_5$O$_{12}$ | 1,3-propene sultone | 1 | Tris(trimethylsilyl) phosphate | 2 | 85 | 0.95 | 1.25 |
| Example 38 | Li$_4$Ti$_5$O$_{12}$ | 1,3-propene sultone | 1 | Tris(trimethylsilyl) phosphate | 3 | 80 | 0.95 | 1.22 |
| Example 39 | Li$_4$Ti$_5$O$_{12}$ | 1,3-propene sultone | 1 | Tris(trimethylsilyl) phosphate | 5 | 75 | 0.95 | 1.2 |
| Example 40 | Li$_4$Ti$_5$O$_{12}$ | 1,3-propene sultone | 1 | Tris(trimethylsilyl) phosphate | 10 | 70 | 1.03 | 1.35 |
| Example 41 | Li$_4$Ti$_5$O$_{12}$ | 1,3-propene sultone | 1 | Tris(trimethylsilyl) phosphate | 2 | 80 | 0.95 | 1.20 |
| | | | | fluorotrimethylsilane | 1 | | | |
| Comparative Example 17 | Graphite | 1,3-propene sultone | 1 | — | — | 20 | 1.8 | >5 (Swelling by gas) |
| Comparative Example 18 | Graphite | 1,3-propene sultone | 1 | Tris(trimethylsilyl) phosphate | 2 | 0 | 2.5 | >5 (Swelling by gas) |
| Comparative Example 19 | Li$_4$Ti$_5$O$_{12}$ | 1,3-propene sultone | 1.5 | — | — | 35 | 1.5 | 1.4 |
| Example 42 | Li$_4$Ti$_5$O$_{12}$ | 1,3-propene sultone | 1.5 | Tris(trimethylsilyl) phosphate | 1 | 75 | 1.1 | 1.3 |
| Example 43 | Li$_4$Ti$_5$O$_{12}$ | 1,3-propene sultone | 1.5 | Tris(trimethylsilyl) phosphate | 2 | 80 | 1 | 1.25 |
| Example 44 | Li$_4$Ti$_5$O$_{12}$ | 1,3-propene sultone | 1.5 | Tris(trimethylsilyl) phosphate | 3 | 75 | 1 | 1.23 |
| Example 45 | Li$_4$Ti$_5$O$_{12}$ | 1,3-propene sultone | 1.5 | Tris(trimethylsilyl) phosphate | 5 | 70 | 1 | 1.2 |
| Example 46 | Li$_4$Ti$_5$O$_{12}$ | 1,3-propene sultone | 1.5 | Tris(trimethylsilyl) phosphate | 10 | 65 | 1.15 | 1.35 |
| Example 47 | Li$_4$Ti$_5$O$_{12}$ | 1,3-propene sultone | 1.5 | Tris(trimethylsilyl) phosphate | 2 | 75 | 1.00 | 1.20 |
| | | | | fluorotrimethylsilane | 1 | | | |
| Comparative Example 20 | Graphite | 1,3-propene sultone | 1.5 | — | — | 0 | 2.0 | >5 (Swelling by gas) |
| Comparative Example 21 | Graphite | 1,3-propene sultone | 1.5 | Tris(trimethylsilyl) phosphate | 2 | 0 | 3.0 | >5 (Swelling by gas) |

TABLE 6

| | Negative electrode active material | First additive | Amount of addition of first additive (% by weight) | Second additive | Amount of addition of second additive (% by weight) | 30 C capacity/ 1 C capacity ratio (%) | Initial resistance (times) | Rate of increase in resistance (times) |
|---|---|---|---|---|---|---|---|---|
| Comparative Example 22 | Li$_4$Ti$_5$O$_{12}$ | — | — | — | — | 85 | 1.00 | 3.00 |
| Example 48 | Li$_4$Ti$_5$O$_{12}$ | 1,3-propene sultone | 0.5 | Tris(trimethylsilyl) phosphate | 0.1 | 45 | 1.30 | 1.60 |
| Example 49 | Li$_4$Ti$_5$O$_{12}$ | 1,3-propene sultone | 0.5 | Tris(trimethylsilyl) phosphate | 0.5 | 70 | 1.00 | 1.40 |
| Example 50 | Li$_4$Ti$_5$O$_{12}$ | 1,3-propene sultone | 0.5 | Tris(trimethylsilyl) phosphate | 1 | 80 | 0.98 | 1.32 |
| Example 51 | Li$_4$Ti$_5$O$_{12}$ | 1,3-propene sultone | 0.5 | Tris(trimethylsilyl) phosphate | 2 | 86 | 0.95 | 1.25 |
| Example 52 | Li$_4$Ti$_5$O$_{12}$ | 1,3-propene sultone | 0.5 | Tris(trimethylsilyl) phosphate | 3 | 90 | 0.90 | 1.22 |
| Example 53 | Li$_4$Ti$_5$O$_{12}$ | 1,3-propene sultone | 0.5 | Tris(trimethylsilyl) phosphate | 5 | 88 | 0.90 | 1.23 |
| Example 54 | Li$_4$Ti$_5$O$_{12}$ | 1,3-propene sultone | 0.5 | Tris(trimethylsilyl) phosphate | 10 | 81 | 0.90 | 1.23 |

TABLE 6-continued

| | Negative electrode active material | First additive | Amount of addition of first additive (% by weight) | Second additive | Amount of addition of second additive (% by weight) | 30 C capacity/ 1 C capacity ratio (%) | Initial resistance (times) | Rate of increase in resistance (times) |
|---|---|---|---|---|---|---|---|---|
| Example 55 | Li$_4$Ti$_5$O$_{12}$ | 1,3-propene sultone | 0.5 | Tris(trimethylsilyl) Phosphate fluorotrimethylsilane | 2 1 | 92 | 0.88 | 1.16 |
| Comparative Example 23 | Graphite | 1,3-propene sultone | 0.5 | — | — | 30 | 1.5 | >5 (Swelling by gas) |
| Comparative Example 24 | Graphite | 1,3-propene sultone | 0.5 | Tris(trimethylsilyl) phosphate | 2 | 10 | 2.0 | >5 (Swelling by gas) |
| Comparative Example 25 | Li$_4$Ti$_5$O$_{12}$ | 1,3-propene sultone | 1 | — | — | 35 | 1.40 | 1.55 |
| Example 56 | Li$_4$Ti$_5$O$_{12}$ | 1,3-propene sultone | 1 | Tris(trimethylsilyl) phosphate | 0.1 | 65 | 1.10 | 1.30 |
| Example 57 | Li$_4$Ti$_5$O$_{12}$ | 1,3-propene sultone | 1 | Tris(trimethylsilyl) phosphate | 0.5 | 75 | 1.03 | 1.28 |
| Example 58 | Li$_4$Ti$_5$O$_{12}$ | 1,3-propene sultone | 1 | Tris(trimethylsilyl) phosphate | 1 | 80 | 1.00 | 1.25 |
| Example 59 | Li$_4$Ti$_5$O$_{12}$ | 1,3-propene sultone | 1 | Tris(trimethylsilyl) phosphate | 2 | 84 | 0.95 | 1.22 |
| Example 60 | Li$_4$Ti$_5$O$_{12}$ | 1,3-propene sultone | 1 | Tris(trimethylsilyl) phosphate | 3 | 82 | 0.95 | 1.23 |
| Example 61 | Li$_4$Ti$_5$O$_{12}$ | 1,3-propene sultone | 1 | Tris(trimethylsilyl) phosphate | 5 | 77 | 0.95 | 1.23 |
| Example 62 | Li$_4$Ti$_5$O$_{12}$ | 1,3-propene sultone | 1 | Tris(trimethylsilyl) phosphate | 10 | 70 | 1.03 | 1.28 |
| Example 63 | Li$_4$Ti$_5$O$_{12}$ | 1,3-propene sultone | 1 | Tris(trimethylsilyl) phosphate fluorotrimethylsilane | 2 1 | 88 | 0.90 | 1.16 |
| Comparative Example 26 | Graphite | 1,3-propene sultone | 1 | — | — | 20 | 1.8 | >5 (Swelling by gas) |
| Comparative Example 27 | Graphite | 1,3-propene sultone | 1 | Tris(trimethylsilyl) phosphate | 2 | 0 | 2.5 | >5 (Swelling by gas) |
| Comparative Example 28 | Li$_4$Ti$_5$O$_{12}$ | 1,3-propene Sultone | 1.5 | — | — | 30 | 1.60 | 1.50 |
| Example 64 | Li$_4$Ti$_5$O$_{12}$ | 1,3-propene sultone | 1.5 | Tris(trimethylsilyl) phosphate | 0.1 | 60 | 1.25 | 1.30 |
| Example 65 | Li$_4$Ti$_5$O$_{12}$ | 1,3-propene sultone | 1.5 | Tris(trimethylsilyl) phosphate | 0.5 | 70 | 1.15 | 1.28 |
| Example 66 | Li$_4$Ti$_5$O$_{12}$ | 1,3-propene sultone | 1.5 | Tris(trimethylsilyl) phosphate | 1 | 75 | 1.08 | 1.27 |
| Example 67 | Li$_4$Ti$_5$O$_{12}$ | 1,3-propene sultone | 1.5 | Tris(trimethylsilyl) phosphate | 2 | 79 | 1.00 | 1.25 |
| Example 68 | Li$_4$Ti$_5$O$_{12}$ | 1,3-propene sultone | 1.5 | Tris(trimethylsilyl) phosphate | 3 | 77 | 1.00 | 1.26 |
| Example 69 | Li$_4$Ti$_5$O$_{12}$ | 1,3-propene sultone | 1.5 | Tris(trimethylsilyl) phosphate | 5 | 72 | 1.00 | 1.26 |
| Example 70 | Li$_4$Ti$_5$O$_{12}$ | 1,3-propene sultone | 1.5 | Tris(trimethylsilyl) phosphate | 10 | 65 | 1.15 | 1.28 |
| Example 71 | Li$_4$Ti$_5$O$_{12}$ | 1,3-propene sultone | 1.5 | Tris(trimethylsilyl) phosphate fluorotrimethylsilane | 2 1 | 83 | 0.95 | 1.18 |
| Comparative Example 29 | Graphite | 1,3-propene sultone | 1.5 | — | — | 0 | 2.0 | >5 (Swelling by gas) |
| Comparative Example 30 | Graphite | 1,3-propene sultone | 1.5 | Tris(trimethylsilyl) phosphate | 2 | 0 | 3.0 | >5 (Swelling by gas) |

These results show that 30 C/1 C capacity ratio, that is, large current performance, is improved by using 1,3-propene sultone and tris(trimethylsilyl)phosphate together in the battery using lithium titanate in the negative electrode. The 30 C/1 C capacity ratio slightly decreases when the amount of addition of tris(trimethylsilyl)phosphate is increased, because conductivity of the electrolyte decreases. The same tendency is confirmed for the initial resistance.

It is also shown that the resistance is suppressed from increasing during the continuous voltage application test by using these additives together while the battery is also suppressed from being deteriorated due to the increased resistance.

Table 5 shows that the rate of increase in the resistance of the batteries in Examples 30, 36 and 42 having a content of the first additive in the range of 0.5 to 1.5% by weight is lower than that of the battery in Example 25 having a content of the first additive of less than 0.5% by weight, when the content of the second additive is a constant value of 1% by weight. The rate of increase in the resistance was lower in the battery having the content of the first additive in the range of 0.5 to 1.5% by weight when the content of the second additive is 2, 3, 5 or 10% by weight.

Table 6 shows that a higher capacity ratio and a lower rate of increase in the resistance are obtained in the battery having a content of the second additive in the range of 1 to 10% by weight than those of the battery having a content of the second additive of less than 1% by weight, when the content of the first additive is 0.5% by weight. However, a high capacity ratio and low rate of increase in the resistance are obtained by controlling the content of the second additive in the range of 1 to 5% by weight when the content of the first additive is in the range of 1 to 1.5% by weight.

No effect of tris(trimethylsilyl)phosphate for suppressing the increase in the resistance caused by 1,3-propene sultone was observed when graphite was used as the negative electrode active material. Since the working potential of the graphite negative electrode is as low as 0.1V vs. Li/Li$^+$, 1,3-propene sultone is completely decomposed by reduction to form a high resistance coating film while tris(trimethylsilyl)phosphate is also excessively decomposed by reduction to also form a high resistance coating film on the negative electrode. Swelling of the battery due to gas generation was observed after the continuous voltage application test. Superposition of forming a high resistance coating film and residence of the gas between the electrodes seems to cause a remarkable increase in the resistance.

The batteries of Examples 55, 63 and 71 using tris(trimethylsilyl)phosphate and fluorotrimethylsilane together, among the batteries of Examples 48 to 71 in which the positive electrode containing lithium manganate and the negative electrode containing lithium titanate are combined, were able to further suppress the resistance from increasing, and it was shown that the effect for suppressing deterioration of the battery due to the increased resistance is high.

(Method of Detecting Prs)

With regard to a secondary battery manufactured in the same manner as in Example 2, the potential was sufficiently stabilized by opening the circuit for 5 hours or more, it was decomposed in a glove box at Ar concentration of 99.9% or more and dew point of −50° C. or less, and the electrode group was taken out. The electrode group was put into a centrifugal settling tube, and dimethyl sulfoxide (DMSO)-d$_6$ was added to seal, and it was taken out from the glove box, and separated centrifugally. Thereafter, in the glove box, a mixed solution of the nonaqueous electrolyte and DMSO-d$_6$ was sampled from the centrifugal settling tube. The mixed solution was poured into an NMR test tube of 5 mm in diameter by about 0.5 ml, and the NMR measurement was carried out. An apparatus used in the NMR measurement was model JNM-LA400WB of JEOL Ltd., the observation nucleus was $^1$H, the observation frequency was 400 MHz, and the residual proton signal contained in a small amount in the dimethyl sulfoxide (DMSO)-d$_6$ was used as internal standard (2.5 ppm). The measuring temperature was 25° C. In the $^1$H NMR spectrum, the peak corresponding to EC was observed around 4.5 ppm. On the other hand, the peak corresponding to PRS was observed around 5.1 ppm, around 7.05 ppm, and around 7.2 ppm. It was confirmed from these results that PRS were contained in the nonaqueous solvent in the secondary battery.

Further, when at the observation frequency of 100 MHz, $^{13}$C NMR was measured by using dimethyl sulfoxide (DMSO)-d$_6$ (39.5 ppm) as an internal standard substance, the peak corresponding to EC was observed around 66 ppm and the peak corresponding to PRS around 74 ppm, around 124 ppm, and around 140 ppm. It was also confirmed from these results that PRS were contained in the nonaqueous solvent in the secondary battery according to Example 2.

Moreover, in the $^1$H NMR spectrum, the ratio of NMR integral intensity of PRS to the NMR integral intensity of EC were determined, and it was confirmed that the PRS rate in the nonaqueous solvent were decreased from before assembly of the secondary battery.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A nonaqueous electrolyte battery comprising:
    a positive electrode;
    a negative electrode containing a titanium-containing oxide; and
    a nonaqueous electrolyte consisting of (a) at least one compound selected from the group consisting of tris(trimethylsilyl)phosphate, tris(triethylsilyl) phosphate, tris(vinyldimethylsilyl) phosphate, bis(trimethylsilyl) methyl phosphate, bis(trimethylsilyl)ethyl phosphate, bis(trimethylsilyl)-n-propyl phosphate, bis(trimethylsilyl)-i-propyl phosphate, bis(trimethylsilyl)-n-butyl phosphate, bis(trimethylsilyl)trichloroethyl phosphate, bis(trimethylsilyl)trifluoroethyl phosphate, bis(trimethylsilyl)pentafluoropropyl phosphate, bis(trimethylsilyl) phenyl phosphate, dimethyltrimethylsilyl phosphate, diethyltrimethylsilyl phosphate, di-n-propyltrimethylsilyl phosphate, di-i-propyltrimethylsilyl phosphate, di-n-butyltrimethylsilyl phosphate, bis(trichloroethyl) trimethylsilyl phosphate, bis(trifluoroethyl) trimethylsilyl phosphate, bis(pentafluoropropyl) trimethylsilyl phosphate and diphenyltrimethylsilyl phosphate and (b) a sultone having an unsaturated hydrocarbon group, an organic solvent and an electrolyte dissolved in the organic solvent, wherein
    the organic solvent is at least one solvent selected from the group consisting of propylene carbonate, ethylene carbonate, vinylene carbonate, diethyl carbonate, dimethyl carbonate, methyl ethyl carbonate, tetrahydrofuran, 2-methyltetrahydrofuran, dioxolan, dimethoxyethane, diethoxyethane, γ-butyrolactone, acetonitrile and sulfolane,
    the concentration of (a) in the nonaqueous electrolyte is from 0.1 to 10% by weight, and
    the concentration of (b) in the nonaqueous electrolyte is from 0.1 to 2% by weight.

2. The battery according to claim 1, wherein the sultone is at least one of 1,3-propene sultone and 1,4-butene sultone.

3. The battery according to claim 1, wherein the at least one compound is tris(trimethylsilyl)phosphate.

4. The battery according to claim 1, wherein a content of the sultone in the nonaqueous electrolyte is from 0.5 to 1.5% by weight, and a content of the compound in the nonaqueous electrolyte is from 1 to 5% by weight.

5. The battery according to claim 1, wherein the titanium-containing oxide has a spinel structure.

6. The battery according to claim 1, wherein the positive electrode contains particles of lithium-transition metal composite oxide and an oxide of at least one element selected from the group consisting of Al, Mg, Zr, B, Ti and Ga, the oxide coating at least a part of a surface of the particles of lithium-transition metal composite oxide.

7. The battery according to claim 1, wherein a diameter distribution of pores of the negative electrode when measured by mercury porosimetry has a first peak having a mode diameter of 0.01 to 0.2 μm, and
    a volume of pores having a diameter of 0.01 to 0.2 μm, which is measured by the mercury porosimetry, is 0.05 to 0.5 mL, per g of the negative electrode excluding a current collector.

8. The battery according to claim 1, wherein a diameter distribution of pores of the negative electrode when measured by mercury porosimetry has a second peak having a mode diameter of 0.003 to 0.02 μm, and a volume of pores having a diameter of 0.003 to 0.02 μm, which is measured by the mercury porosimetry, is 0.0001 to 0.02 mL, per g of the negative electrode excluding a current collector.

9. A battery pack comprising the nonaqueous electrolyte battery according to claim 1.

10. The battery pack according to claim 9, wherein the sultone is at least one of 1,3-propene sultone and 1,4-butene sultone.

11. The battery pack according to claim 9, wherein the at least one compound is tris(trimethylsilyl)phosphate.

12. The battery pack according to claim 9, wherein the sultone is 1,3-propene sultone and the at least one compound is tris(trimethylsilyl)phosphate.

13. The battery pack according to claim 9, wherein a content of the sultone in the nonaqueous electrolyte is from 0.1 to 2% by weight, and a content of the compound in the nonaqueous electrolyte is from 0.1 to 10% by weight.

14. The battery pack according to claim 9, wherein a content of the sultone in the nonaqueous electrolyte is from 0.5 to 1.5% by weight, and a content of the compound in the nonaqueous electrolyte is from 1 to 5% by weight.

15. The battery pack according to claim 9, wherein the titanium-containing oxide has a spinel structure.

16. The battery pack according to claim 9, wherein the organic solvent is two or more solvents selected from the group consisting of diethyl carbonate, propylene carbonate and γ-butyrolactone.

17. The battery pack according to claim 9, wherein the organic solvent contains γ-butyrolactone.

18. The battery pack according to claim 9, wherein the positive electrode contains particles of lithium-transition metal composite oxide and an oxide of at least one element selected from the group consisting of Al, Mg, Zr, B, Ti and Ga, the oxide coating at least a part of a surface of the particles of lithium-transition metal composite oxide.

19. The battery pack according to claim 9, wherein a diameter distribution of pores of the negative electrode when measured by mercury porosimetry has a first peak having a mode diameter of 0.01 to 0.2μ, and a volume of pores having a diameter of 0.01 to 0.2 μm, which is measured by the mercury porosimetry, is 0.05 to 0.5 mL, per g of the negative electrode excluding a current collector.

20. The battery pack according to claim 9, wherein a diameter distribution of pores of the negative electrode when measured by mercury porosimetry has a second peak having a mode diameter of 0.003 to 0.02 μm, and a volume of pores having a diameter of 0.003 to 0.02 μm, which is measured by the mercury porosimetry, is 0.0001 to 0.02 mL, per g of the negative electrode excluding a current collector.

21. A vehicle comprising the nonaqueous electrolyte battery according to claim 1.

22. The battery according to claim 1, wherein a coating film is formed on a surface of the negative electrode, and is stabilized by a decomposition of the sultone in the presence of (a).

* * * * *